(12) United States Patent
Ito et al.

(10) Patent No.: US 10,352,821 B2
(45) Date of Patent: Jul. 16, 2019

(54) BEARING ABNORMALITY SENSING SYSTEM FOR RAILWAY VEHICLE

(71) Applicant: NTN CORPORATION, Osaka (JP)

(72) Inventors: Hiroyoshi Ito, Kuwana (JP); Katsuyoshi Suzuki, Kuwana (JP)

(73) Assignee: NTN CORPORATION, Osaka (JP)

(*) Notice: Subject to any disclaimer, the term of this patent is extended or adjusted under 35 U.S.C. 154(b) by 135 days.

(21) Appl. No.: 15/453,301

(22) Filed: Mar. 8, 2017

(65) Prior Publication Data
US 2017/0176287 A1 Jun. 22, 2017

Related U.S. Application Data

(63) Continuation of application No. PCT/JP2015/074664, filed on Aug. 31, 2015.

(30) Foreign Application Priority Data

Sep. 12, 2014 (JP) .................. 2014-186085
Oct. 2, 2014 (JP) .................. 2014-203976
Oct. 2, 2014 (JP) .................. 2014-203977

(51) Int. Cl.
B61F 15/12 (2006.01)
F16C 19/52 (2006.01)
(Continued)

(52) U.S. Cl.
CPC .......... *G01M 13/045* (2013.01); *B61F 15/12* (2013.01); *B61K 9/04* (2013.01); *F16C 19/52* (2013.01);
(Continued)

(58) Field of Classification Search
CPC .......... B61F 15/12; B61K 9/04; F16C 19/52; G01H 17/00; G01M 13/04; G01M 17/08; G01M 13/045; G01M 17/10
(Continued)

(56) References Cited

U.S. PATENT DOCUMENTS 4,493,042 A * 1/1985 Shima .................. G01H 1/003
702/35
5,150,618 A 9/1992 Bambara
(Continued)

FOREIGN PATENT DOCUMENTS

CN 1688874 A 10/2005
CN 102200708 A 9/2011
(Continued)

OTHER PUBLICATIONS

Office Action dated May 3, 2018, in corresponding Chinese Patent Application No. 201580048501.X, 9 pgs.
(Continued)

*Primary Examiner* — Jacques M Saint Surin

(57) ABSTRACT

Provided is a railway vehicle bearing abnormality sensing system that can accurately perform abnormality determination for railway vehicle bearings. The system (100) senses an abnormality in a plurality of rolling bearings (17) housed in an axle box (3) provided to a bogie (2). The system (100) includes: vibration detection devices (15) each detecting vibration of a rolling bearing; an analysis device (6) determining an abnormality in the bearings (17) on the basis of detection data detected by the device (15); and reception response detection start module (13) receiving a detection start signal and cause the device (15) to detect vibration of the rolling bearing. The system (100) further includes a measurement start command transmitting device (4), installed apart from a railway vehicle, transmitting the detection start signal to the module (13).

16 Claims, 18 Drawing Sheets

(51) Int. Cl.
  *G01H 17/00* (2006.01)
  *G01M 13/04* (2019.01)
  *G01M 17/08* (2006.01)
  *G01M 17/10* (2006.01)
  *G01M 13/045* (2019.01)
  *B61K 9/04* (2006.01)

(52) U.S. Cl.
  CPC ............ *G01H 17/00* (2013.01); *G01M 13/04* (2013.01); *G01M 17/08* (2013.01); *G01M 17/10* (2013.01)

(58) Field of Classification Search
  USPC .......................................................... 73/593
  See application file for complete search history.

(56) References Cited

U.S. PATENT DOCUMENTS

| | | | | |
|---|---|---|---|---|
| 5,433,111 | A * | 7/1995 | Hershey | B61K 9/08 246/169 R |
| 5,579,013 | A * | 11/1996 | Hershey | B61K 9/08 342/357.4 |
| 6,672,681 | B1 * | 1/2004 | Moretti | B61K 9/04 301/109 |
| 7,184,930 | B2 * | 2/2007 | Miyasaka | B61F 15/20 246/169 A |
| 7,561,035 | B2 * | 7/2009 | Sahashi | B60C 23/041 340/442 |
| 7,640,139 | B2 * | 12/2009 | Sahara | G01H 1/003 702/182 |
| 7,688,218 | B2 * | 3/2010 | LeFebvre | B61K 9/00 340/682 |
| 7,860,663 | B2 * | 12/2010 | Miyasaka | G01H 1/003 702/113 |
| 8,534,128 | B2 * | 9/2013 | Murayama | G01H 1/003 73/593 |
| 8,537,382 | B2 | 9/2013 | Tokairin | |
| 2006/0167659 | A1 | 7/2006 | Miyasaka et al. | |
| 2007/0118333 | A1 | 5/2007 | Miyasaka et al. | |
| 2008/0033695 | A1 | 2/2008 | Sahara et al. | |
| 2011/0236035 | A1 | 9/2011 | Tokairin | |
| 2015/0057956 | A1 | 2/2015 | Ooe et al. | |

FOREIGN PATENT DOCUMENTS

| | | |
|---|---|---|
| DE | 10 2009 016 763 A1 | 10/2010 |
| JP | 2-310464 | 12/1990 |
| JP | 2006-275954 | 10/2006 |
| JP | 2006-341659 | 12/2006 |
| JP | 2007-170815 | 7/2007 |
| JP | 4529602 | 8/2010 |
| JP | 2013-257265 | 12/2013 |
| JP | 2014-215164 | 11/2014 |
| WO | WO 01/89903 A1 | 11/2001 |
| WO | WO 2013/146502 A1 | 10/2013 |
| WO | WO 2015/137218 A1 | 9/2015 |

OTHER PUBLICATIONS

Extended European Search Report dated Apr. 26, 2018, in corresponding European Patent Application No. 15840358.4, 8 pgs.
Office Action dated Jun. 5, 2018 in corresponding Japanese Patent Application No. 2014-186085, 6 pgs.
Office Action dated Jun. 5, 2018 in corresponding Japanese Patent Application No. 2014-203976, 7 pgs.
Office Action dated Jun. 5, 2018 in corresponding Japanese Patent Application No. 2014-203977, 7 pgs.
International Search Report dated Oct. 20, 2015 in corresponding International Application No. PCT/JP2015/074664.
International Preliminary Report on Patentability dated Mar. 23, 2017 in corresponding International Patent Application No. PCT/JP2015/074664.
Decision of Refusal dated Dec. 4, 2018 in corresponding Japanese Patent Application No. 2014-186085.
Decision of Refusal dated Dec. 4, 2018 in corresponding Japanese Patent Application No. 2014-203976.
Decision of Refusal dated Dec. 4, 2018 in corresponding Japanese Patent Application No. 2014-203977.

* cited by examiner

Fig. 2
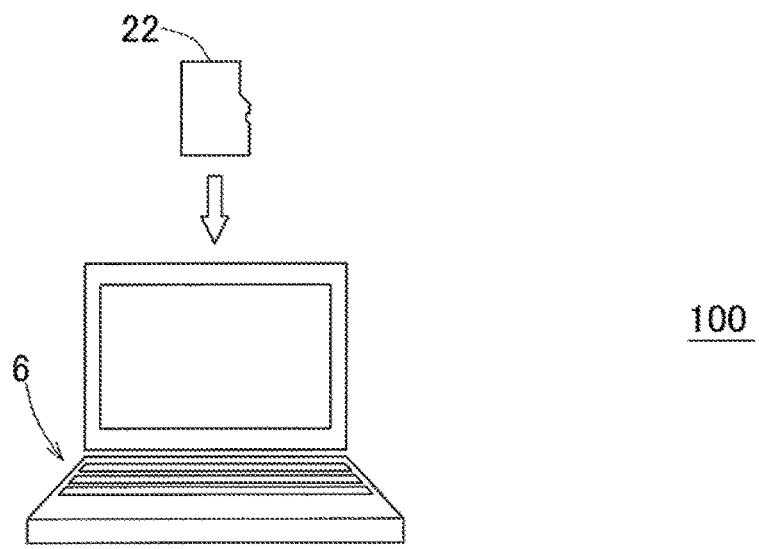
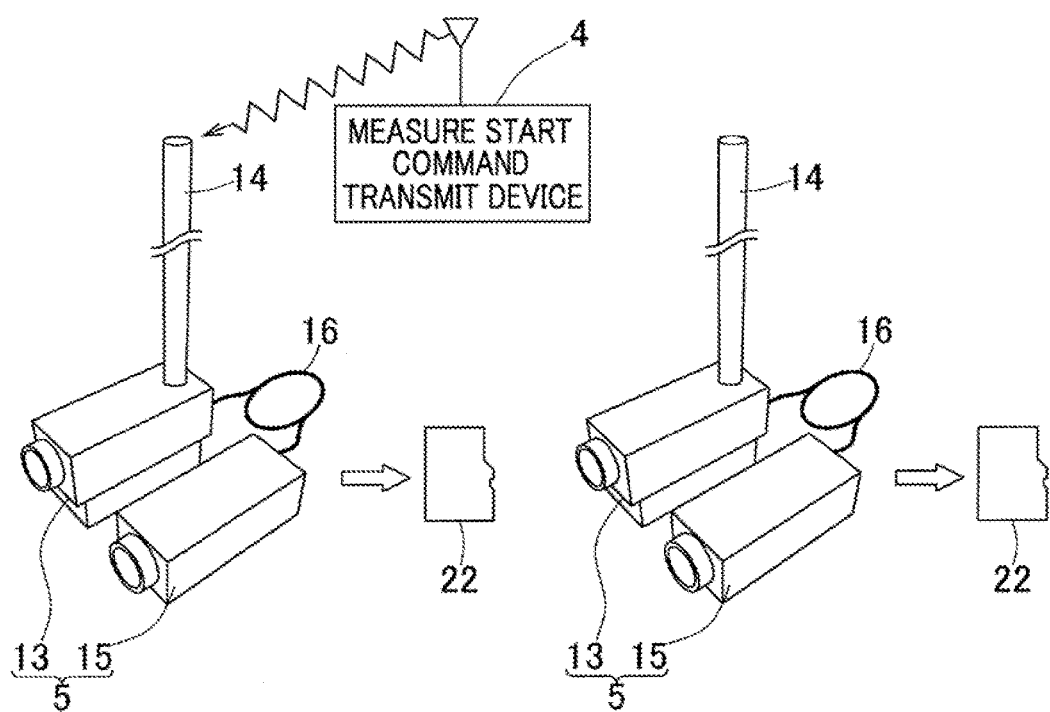

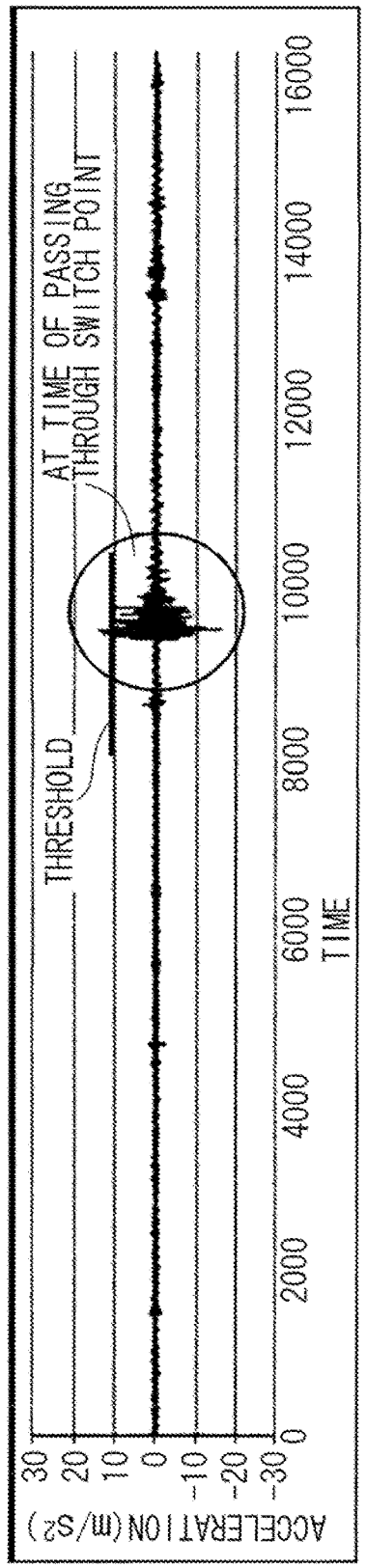

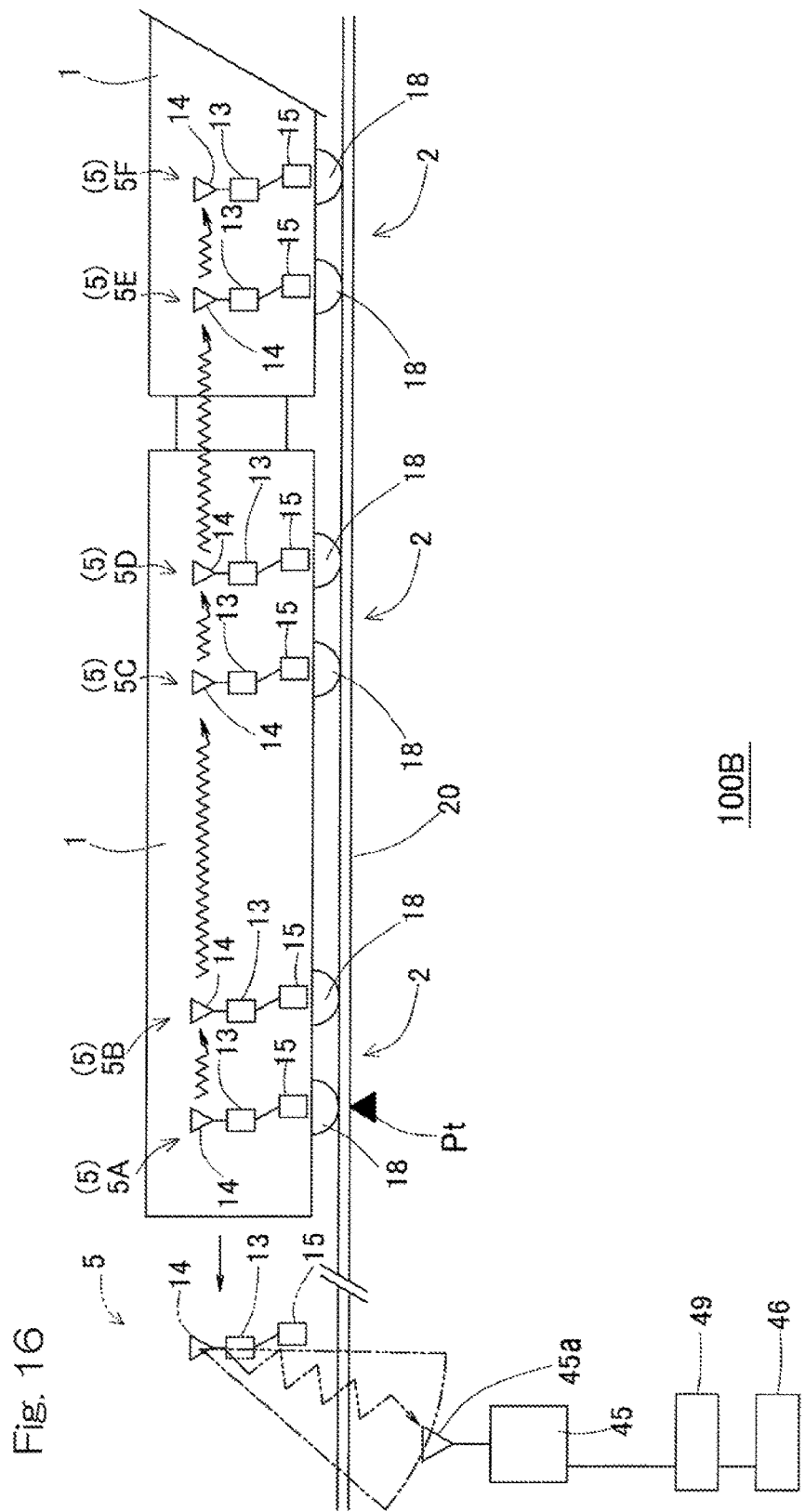

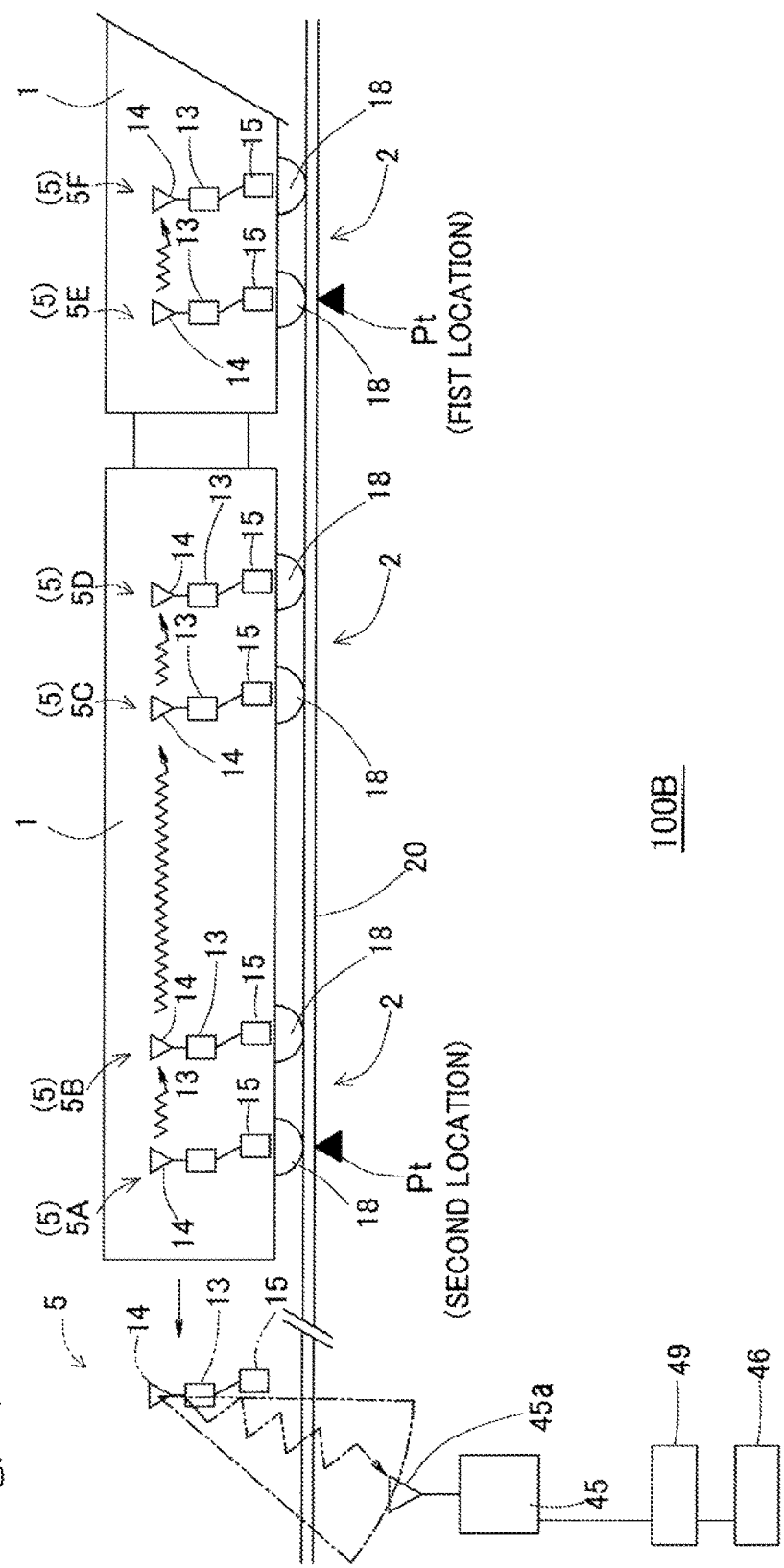

BEARING ABNORMALITY SENSING SYSTEM FOR RAILWAY VEHICLE

CROSS REFERENCE TO THE RELATED APPLICATION

This application is a continuation application, under 35 U.S.C. § 111(a), of international application No. PCT/JP2015/074664, filed Aug. 31, 2015, which claims Convention priority to Japanese patent application No. 2014-186085, filed Sep. 12, 2014, and Japanese patent application Nos. 2014-203976 and 2014-203977, filed Oct. 2, 2014, the entire disclosure of which is herein incorporated by reference as a part of this application.

BACKGROUND OF THE INVENTION

Field of the Invention

The present invention relates to a railway vehicle bearing abnormality sensing system that senses an abnormality in axle bearings in a railway vehicle.

Description of Related Art

In a railway vehicle, when an abnormality occurs in an axle bearing, it is necessary to take measures such as stopping an operation of the vehicle. In this case, a large amount of loss occurs. For that reason, a railway vehicle bearing assembly with a sensor has been proposed on which various detection elements are mounted for detecting an operating state of the bearing assembly (Patent Document 1).

RELATED DOCUMENT

Patent Document

[Patent Document 1] JP Patent No. 4529602

SUMMARY OF THE INVENTION

In detection of vibration of a bearing in the railway vehicle bearing assembly with the sensor, disturbance vibration occurring when a wheel passes through a rail joint or a switch point while a vehicle is running is detected together with a vibration waveform attributed to an abnormality in the bearing. Thus, there is a problem that abnormality determination for the bearing cannot be accurately performed.

An object of the present invention is to provide a railway vehicle bearing abnormality sensing system that can accurately perform abnormality determination for railway vehicle bearings.

Hereinafter, for convenience of easy understanding, a description will be given with reference to the reference signs in embodiments.

A railway vehicle bearing abnormality sensing system according to a first aspect of the present invention is a railway vehicle bearing abnormality sensing system 100 for sensing an abnormality in a plurality of rolling bearings 17 housed in at least one axle box 3 when the railway vehicle 1 runs on travelling rails 20, the railway vehicle 1 including at least one bogie 2, the at least one bogie 2 including the at least one axle box 3, one or more of the plurality of rolling bearings 17 being associated with one of the at least one axle box 3, the railway vehicle bearing abnormality sensing system 100 including:

a plurality of vibration detection devices 15 each configured to detect vibration of an associated one of the plurality of rolling bearing 17;

an analysis device 6 configured to determine an abnormality in the rolling bearings 17 on the basis of pieces of detection data, each piece indicating the vibration of the rolling bearing 17 detected by the associated vibration detection device 15;

a plurality of reception response detection start module 13 connected to the vibration detection devices 15, respectively, each reception response detection start module 13 causing the connected vibration detection device 15 to detect vibration of the associated rolling bearing 17 when receiving a detection start signal; and at least one measurement start command transmitting device 4 installed apart from the railway vehicle 1 and configured to transmit the detection start signal to the reception response detection start modules 13.

According to this configuration, the measurement start command transmitting device 4 transmits the detection start signal to the reception response detection start modules 13. Upon reception of the detection start signal, each of the reception response detection start modules 13 causes the connected vibration detection device 15 to detect vibration of the associated rolling bearing 17. The analysis device 6 determines an abnormality in the rolling bearings 17 on the basis of pieces of detection data, each piece being detected by the vibration detection device 15.

The measurement start command transmitting device 4 is installed apart from the railway vehicle 1 and is preferably installed at such a location that, when a rolling bearing 17 of the plurality of rolling bearings 17 passes over a rail joint or a switch point of the travelling rails 20, the reception response detection start module 13 connected to the vibration detection device 15 corresponding to the rolling bearing 17 receives no detection start signal. For example, the measurement start command transmitting device 4 is installed at a position along the travelling rails 20 (i.e., within a predetermined distance from the travelling rails 20 in the direction orthogonal to the travelling rails 20) and at a position apart from the switch point or the rail joint of the travelling rails 20 in a rail longitudinal direction. Accordingly, at a time that does not coincide with the time when passing over the rail joint or the switch point, the reception response detection start module 13 receives the detection start signal from the measurement start command transmitting device 4 and causes the vibration detection device 15 to detect vibration of the rolling bearing 17.

Since the vibration detection device 15 detects vibration at a time that does not coincide with the time when passing through the rail joint or the switch point, an undesired vibration waveform other than a vibration waveform attributed to a bearing abnormality does not appear in the detection data. Thus, the detection data that is the vibration waveform attributed to the bearing abnormality is clearly identified. Therefore, the abnormality determination for the railway vehicle bearing 17 is accurately performed with the detection data that does not include the vibration waveform attributed to passing through the rail joint or the switch point of the travelling rails 20.

The measurement start command transmitting device 4 may be installed at a position apart from a rail joint or a switch point of the travelling rails 20 in the rail longitudinal direction by a predetermined distance.

The predetermined distance is based on the results of a test, simulation, or the like.

As a result, while the railway vehicle 1 is caused to run on the travelling rails 20, before or after the axle box 3 for the vibration detection target passes through the rail joint or the switch point, the reception response detection start module 13 receives the detection start signal from the measurement start command transmitting device 4 and causes the vibration detection device 15 to detect vibration of the rolling bearing 17. Therefore, the vibration detection device 15 assuredly detects only vibration of the rolling bearing 17.

A plurality of the reception response detection start module 13 may be provided at each of the axle boxes 3 in which the rolling bearings 17 are housed, the rolling bearings being vibration detection targets, and when each reception response detection start module 13 receives the detection start signal, each reception response detection start module 13 may transmit the detection start signal to the reception response detection start module 13 associated with the rolling bearing 17 that is a subsequent vibration detection target. According to this configuration, when a measuring person merely installs and turns on the measurement start command transmitting device and the like, all the reception response detection start modules 13 automatically receives the detection start signal. Thus, an operation process on each reception response detection start module 13 associated with the rolling bearing 17 that is the subsequent vibration detection target can be omitted. Therefore, simple operability is achieved.

The at least one measurement start command transmitting device 4 may include a plurality of the measurement start command transmitting devices 4, the rail joint or the switch point may include a plurality of rail joints or switch points provided at the travelling rails 20, and the measurement start command transmitting devices 4 may be installed apart from the rail joints or the switch points, respectively, in the rail longitudinal direction by a predetermined distance. According to this configuration, the total sum of time lags in measurement (delays of time taken for transmission), between the reception response detection start module 13 (slave unit) and the reception response detection start module 13 (slave unit) provided at the rolling bearing 17 that is the subsequent vibration detection target, is reduced. In addition, the time lags in measurement between the slave units can be made constant. Thus, a delay time required for avoiding coincidence of a measurement time of the subsequent slave unit and passing through a rail joint or a switch point may not be necessary.

The measurement start command transmitting device 4 may be installed in a railway yard where the railway vehicle 1 is caused to run so as to be inspected.

A condition for each of the plurality of vibration detection devices 15 detecting vibration of the associated rolling bearing 17 may be that a drive motor configured to drive the railway vehicle 1 to run is in a non-energized state and a speed of the railway vehicle 1 falls into the range between 25 km/h and 35 km/h. According to this configuration, for example, the railway vehicle 1 is caused to run at a constant vehicle speed by the drive motors, and then the drive motors are non-energized to cause the railway vehicle 1 to run by the inertial force thereof. Thereafter, vibration of the rolling bearings 17 are detected. Accordingly, while vibrations of the rolling bearings 17 are detected, adverse noise caused by electromagnetic waves from the drive motor is reduced.

According to a preferred embodiment, the railway vehicle bearing abnormality sensing system further includes:

a plurality of detection data transmitting devices 13 connected to the plurality of vibration detection devices 15, respectively, each detection data transmitting device 13 configured to transmit detection data indicating the vibration of the rolling bearing 17 detected by the associated vibration detection devices 15; and a data collection device 45 installed apart from the railway vehicle 1 and configured to receive and collect the detection data transmitted from the detection data transmitting devices 13, and the analysis device 6 determines an abnormality in the plurality of rolling bearings 17 on the basis of the detection data collected by the data collection device 45.

Each detection data transmitting device 13 transmits the detection data detected by the associated vibration detection device 15. The data collection device 45 receives and collects the detection data transmitted from the detection data transmitting devices 13. The analysis device 6 determines an abnormality in the rolling bearings 17 on the basis of the detection data collected by the data collection device 45.

The data collection device 45 receives and collects the detection data transmitted from the detection data transmitting devices 13, and thus, for example, unlike data transmission via a wire, a recording medium, or the like, construction for electric wires and an operation of picking out data are not required. Therefore, the detection data is easily obtained, and the cost is reduced.

The measurement start command transmitting device 4 and the data collection device 45 may be installed within a predetermined distance from the travelling rails 20 in a direction orthogonal to the travelling rails 20.

The predetermined distance is such a degree that a position of the measurement start command transmitting device 4 allows the reception response detection start module 13 to receive the detection start signal from the measurement start command transmitting device 4 and a position of the data collection device 45 allows the data collection device 45 to receives the detection data from the detection data transmitting devices 13.

A railway vehicle bearing abnormality sensing system according to a second aspect of the present invention is a railway vehicle bearing abnormality sensing system for sensing an abnormality in a plurality of rolling bearings 17 housed in at least one axle box 3 when the railway vehicle 1 runs on travelling rails 20, the railway vehicle 1 including at least one bogie 2, the at least one bogie 2 including the at least one axle box 3, one or more of the plurality of rolling bearing 17 being associated with one of the at least one axle box 3, the railway vehicle bearing abnormality sensing system including:

a plurality of vibration detection devices 15 each configured to detect vibration of an associated one of the plurality of rolling bearings 17 and disturbance vibration;

a plurality of vibration measurement start module 53 connected to the vibration detection devices 15, respectively, each vibration measurement start module 53 causing the connected vibration detection device 15 to start vibration measurement of the associated rolling bearing 17 when the vibration detection device 15 detects disturbance vibration; and an analysis device 6 configured to determine an abnormality in the rolling bearings 17 on the basis of detection data obtained from the started vibration measurement.

The disturbance vibration may be detected when a detection value detected by the vibration detection device is equal to or greater than a predetermined value. The predetermined value is such a value that is a trigger for handling or dealing with detection by the vibration detection device as detection data indicating vibration of the rolling bearing 17. The detection value that is equal to or greater than the predetermined value is, for example, detected when passing through a rail joint or a switch point of the travelling rails 20. The predetermined value is determined in advance on the basis of the results of a test, simulation, or the like.

According to this configuration, when disturbance vibration is detected, the vibration measurement start module 53 starts vibration measurement of the rolling bearing 17. The analysis device 6 determines an abnormality in the rolling bearings 17 on the basis of vibration measurement data obtained from the started vibration measurement. Since detection of disturbance vibration is set as a trigger and a detection value obtained thereafter is incorporated as detection data indicating vibration of the rolling bearing 17, the vibration detection devices 15 can be used for starting vibration measurement, so that it is not necessary to additionally provide a device for starting vibration measurement. Accordingly, the entire configuration of the apparatus is simplified, and the cost is reduced.

At a point of time when the vibration detection device 15 detects disturbance vibration occurring when passing through a rail joint or a switch point, vibration measurement is started, and a detected detection value is incorporated as detection data indicating vibration of the rolling bearing 17, whereby an undesired vibration waveform other than a vibration waveform attributed to a bearing abnormality does not appear in the detection data. Thus, the detection data that is the vibration waveform attributed to the bearing abnormality is clearly identified. Therefore, the abnormality determination for the railway vehicle bearing 17 is accurately performed with the detection data that does not include the vibration waveform attributed, to passing through the rail joint or the switch point of the travelling rails 20.

According to a preferred embodiment, the railway vehicle bearing abnormality sensing system further includes: a plurality of detection data transmitting devices 13 connected to the plurality of vibration detection devices 15, respectively, each detection data transmitting device 13 configured to transmit detection data indicating the vibration of the rolling bearing 17 detected by the associated vibration detection devices 15; and a data collection device 45 installed within a predetermined distance from the travelling rails 20 in a direction orthogonal to the travelling rails 20 and configured to receive and collect the detection data transmitted from the detection data transmitting devices 13.

The predetermined distance is such a deuce that a position of the data collection device 45 allows the detection data transmitted from the detection data transmitting devices 13 to be received.

Each detection data transmitting device 13 transmits the detection data detected by the corresponding vibration detection device 15. The data collection device 45 receives and collects the detection data transmitted by radio from the detection data transmitting devices 13. Thus, for example, unlike data transfer via a wire, a recording medium, or the like, construction for electric wires and an operation of picking out data are not required. Therefore, the detection data is easily obtained, and the cost is reduced.

The data collection device 45 may receive and collect the detection data together with an ID associated with each vibration detection device. Since the detection data is collected by the data collection device 45 together with the ID as described above, it is readily identified in which axle box 3 the rolling bearing 17 is abnormal.

According to a preferred embodiment, the railway vehicle bearing abnormality sensing system may further include a data storage server 46 configured to store the detection data and the ID transmitted from the data collection device 45 via a telephone network, and the analysis device 6 may determine an abnormality in each rolling bearing 17 on the basis of the detection data and the ID transmitted from the data storage server 46. According to this configuration, obtaining the detection data is simplified, and analysis time is shortened.

The analysis device 6 may include:
a diagnosis unit 50 configured to diagnose the rolling bearing 17 as being abnormal when an analysis value obtained by performing frequency analysis of the detection data with respect to the rolling bearing is equal to or greater than a set vibration threshold, and diagnose a rolling bearing 17 as being normal when the analysis is less than the set vibration threshold;
a storage unit 51 configured to store an analysis result obtained from the diagnosis by the diagnosis unit 50; and
a display unit 52 configured to display the analysis result obtained from the diagnosis by the diagnosis unit 50.

The vibration threshold is, for example, based on the results of an experiment, simulation, or the like.

According to this configuration, the diagnosis unit 50 diagnoses the rolling bearing 17 as being abnormal when the analysis value is equal to or greater than the threshold, and diagnoses the rolling bearing 17 as being normal when the analysis value is less than the threshold. The storage unit 51 stores the diagnosis result obtained from the diagnosis. Since the analysis result is displayed on the display unit 52, a measuring person can watch the analysis result without delay.

Further, or instead, the analysis result obtained from the diagnosis by the diagnosis unit 50 may be transmitted to the data storage server 46 together with the ID. According to this configuration, since the analysis result is transmitted to the data storage server 46 together with the ID, the analysis result can be viewed and confirmed for each ID as necessary.

According to a preferred embodiment, the railway vehicle bearing abnormality sensing system may further include electronic equipment configured to cause the analysis result recorded in the data storage server 46 to be viewed for each ID. The electronic equipment includes various electronic equipment such as a personal computer, a mobile phone, a smartphone, a PDA, or the like. The analysis result can be viewed and confirmed for each ID by accessing the data storage server 46 with such electronic equipment. As the analysis result, not only a person who manages this system but also a person who manages peripheral apparatuses including the railway vehicle 1 can easily acquire maintenance information such as bearing replacement information and information such as ordering arrangement information by accessing the data storage server 46 by using various devices described above.

According to a preferred embodiment, the railway vehicle bearing abnormality sensing system further includes a storage device 46 configured to store the ID and a bearing model number, an axle box number, and a vehicle number related to the rolling bearing associated with the ID, and a date at which the detection data is obtained, in connection with the detection data. According to this configuration, the workload involved in arrangement and management of the detection data is reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts throughout the several views, and:

FIG. 2 is a perspective view showing the appearance of the railway vehicle bearing abnormality sensing system according to the first embodiment;

FIG. 15B is a graph showing a pattern of a vibration waveform detected by the bearing abnormality sensing system in FIG. 13 when passing through a rail joint or a switch point;

FIG. 16 is a diagram showing an example of vibration measurement by the bearing abnormality sensing system in FIG. 13; and FIG. 17 is a diagram showing an example of vibration measurement by the railway vehicle bearing abnormality sensing system according to the sixth embodiment.

DESCRIPTION OF EMBODIMENTS

Figure 1:
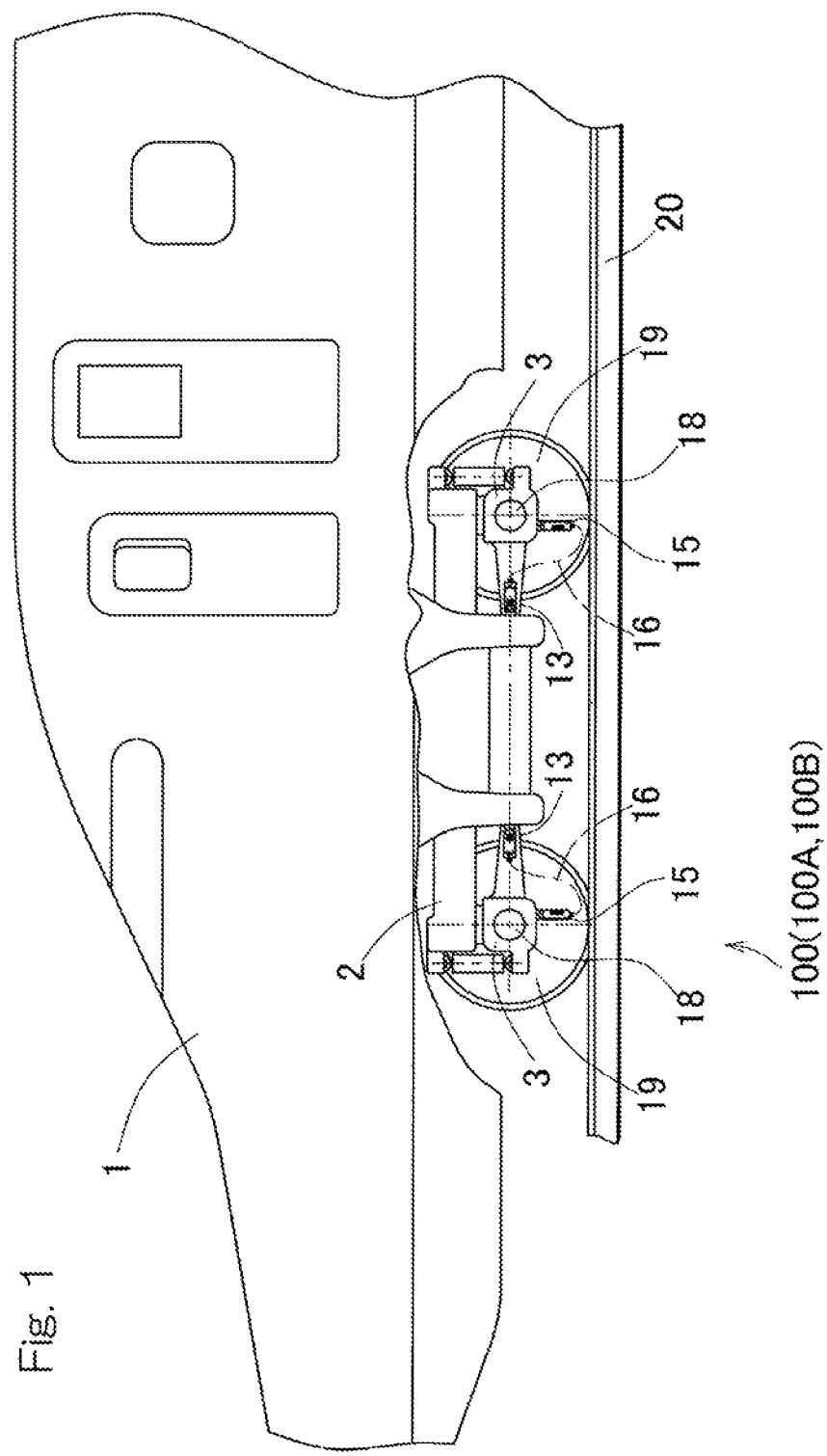
FIG. 1 is a diagram showing an example of installation of railway vehicle bearing abnormality sensing systems according to first to sixth embodiments of the present invention.

A railway vehicle bearing abnormality sensing system according to a first embodiment of the present invention will be described with reference to FIGS. 1 to 7. As shown in FIG. 1, the bearing abnormality sensing system 100 is an apparatus that senses an abnormality in a plurality of rolling bearings that are housed in at least one axle box 3. One or more of the plurality of rolling bearings are associated with one of the at least one axle box 3. The axle box 3 is provided to one of at least one bogie 2 mounted in a railway vehicle 1. The railway vehicle 1 includes various railway vehicles such as a bullet train. For example, in inspecting bearings and the like in a vehicle site when the vehicle is inspected, the bearing abnormality sensing system externally detects vibration of the bearings without detaching the bearings from the axle boxes 3.

FIG. 2 is a perspective view showing the appearance of the bearing abnormality sensing system 100. As shown in FIGS. 1 and 2, the bearing abnormality sensing system 100 includes a measurement start command transmitting device (master unit) 4, a plurality of slave unit sets 5, and an analysis device 6. The measurement start command transmitting device 4 is installed at a place apart from the railway vehicle 1, for example, in the vicinity of travelling rails 20. A plurality of the slave unit sets 5 are provided for each axle box 3, which is a vibration detection target. Each of these slave unit sets 5 is detachably provided at a specific location in the railway vehicle 1 as described later. The analysis device 6 is implemented, for example, via a processor of a personal computer.

The measurement start command transmitting device 4 transmits a detection start signal to a measurement start command transmitting/receiving device (reception response detection start module) 13 in a slave unit set 5. The measurement start command transmitting device 4 is installed in the vicinity of the travelling rails 20 and at a position apart from a switch point or a rail joint in longitudinal direction of the rails 20 by a predetermined distance. The place where the measurement start command transmitting device 4 is installed is a position that allows the slave unit set 5, which is installed to the axle box 3 that is a vibration detection target, to receive the detection start signal transmitted from the measurement start command transmitting device 4, when the slave unit set 5 comes close to the measurement start command transmitting device 4 such that the distance from the measurement start command transmitting device 4 falls within a predetermined range, and is also a position apart from the rail joint or the switch point by the predetermined distance such that disturbance vibration occurring in the bearing within the axle box 3 is not detected when the axle box 3, which is a vibration detection target, passes over the rail joint or the switch point. While the railway vehicle 1 runs along the travelling rails 20, the measurement start command transmitting device 4 is kept turned on, and thus the measurement start command transmitting device 4 can transmit the detection start signal to the slave unit sets 5.

Figure 3:
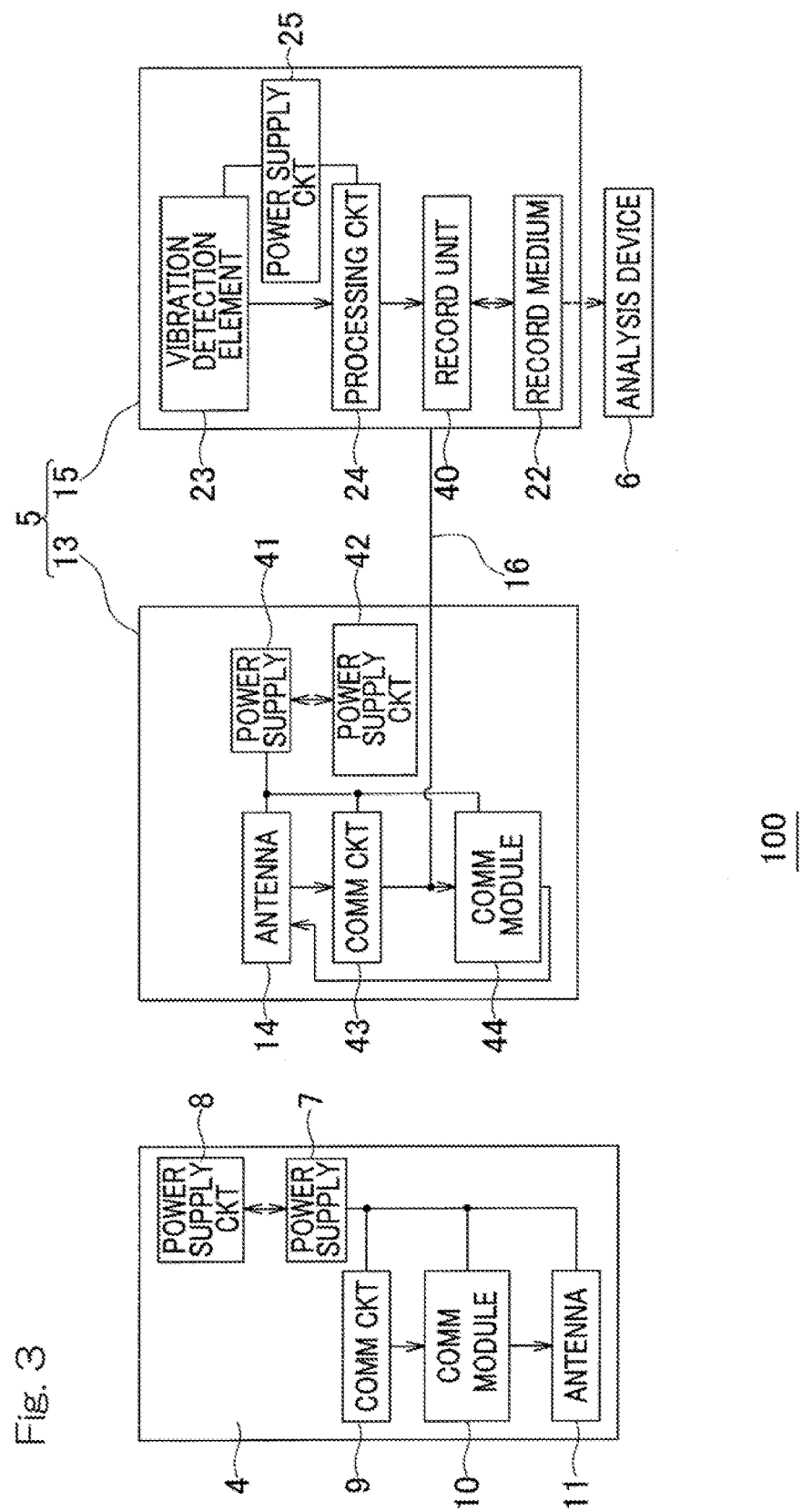
FIG. 3 is a block diagram of a control system of the bearing abnormality sensing system in FIG. 2.

FIG. 3 is a block diagram of a control system of the bearing abnormality sensing system 100.

The measurement start command transmitting device 4 includes a power supply 7, a power supply circuit 8, a communication circuit 9, a communication module 10, and an antenna 11. A power supply voltage supplied from the power supply 7 is changed to a desired voltage by the power supply circuit 8 and supplied to the communication circuit 9, the communication module 10, and the antenna 11 at the subsequent stage. The detection start signal is converted to an electromagnetic wave having a predetermined frequency by the communication circuit 9 and transmitted to the measurement start command transmitting/receiving device 13 of the slave unit set 5 via the communication module 10 and the antenna 11. The communication module 10 may include a ZigBee module, which reduce power consumption.

Each slave unit set 5 includes a vibration detection device 15 and the measurement start command transmitting/receiving device (reception response detection start module) 13. The vibration detection device 15 and the measurement start command transmitting/receiving device 13 are electrically connected to each other via an electric wire 16.

Figure 4:
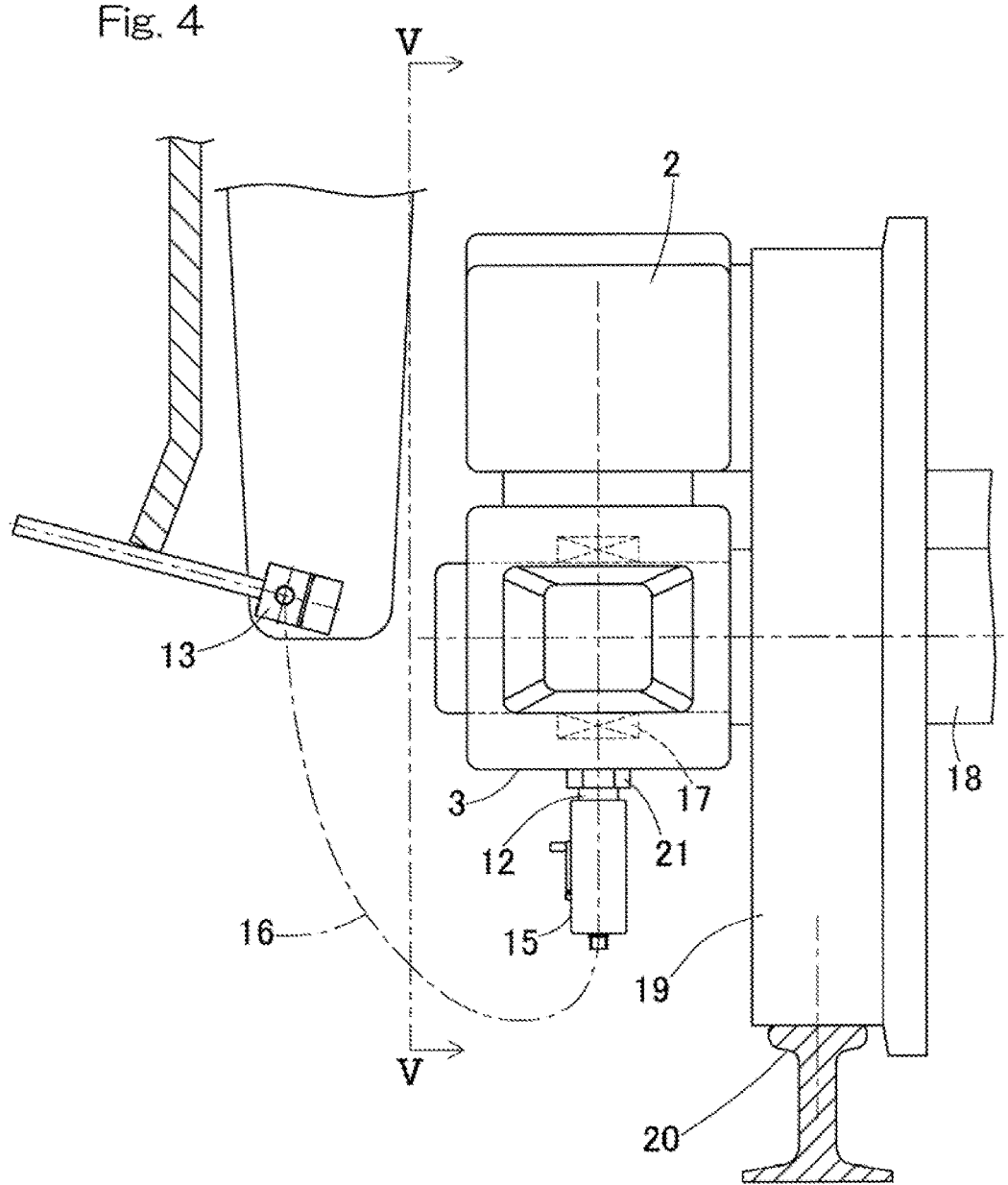
FIG. 4 is a diagram showing an example of mounting of a measurement start command transmitting/receiving device and a vibration detection device of the bearing abnormality sensing system in FIG. 1.
Figure 5:
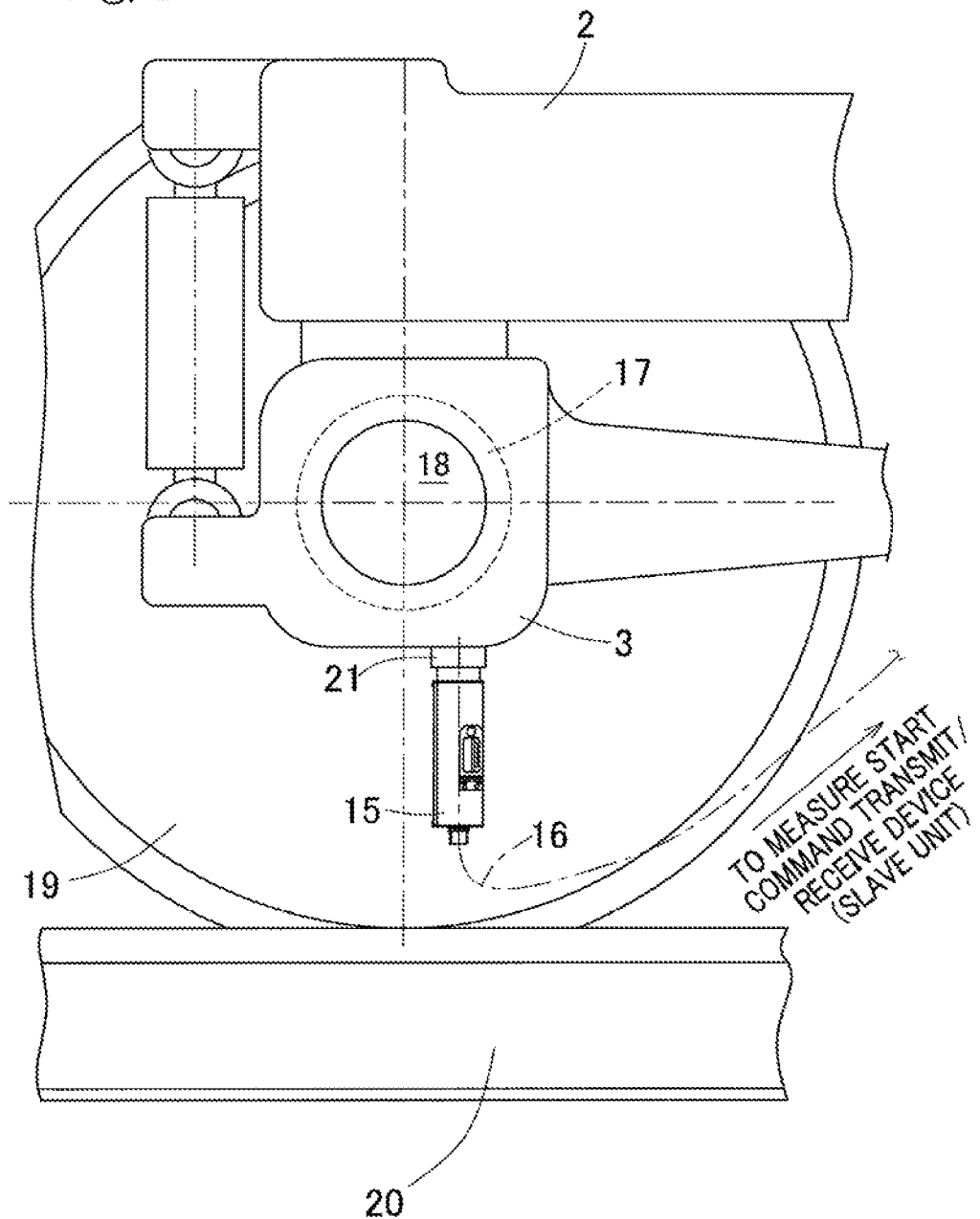
FIG. 5 is an end view as seen from a line V-V in FIG. 4.

FIG. 4 is a diagram showing an example of mounting of the measurement start command transmitting/receiving device 13 and the vibration detection device 15 of the bearing abnormality sensing system. FIG. 5 is an end view as seen from a line V-V in FIG. 4. FIG. 5 is also an enlarged view around a wheel 19 of the leading car in FIG. 1. As shown in FIGS. 1, 4, and 5, the vibration detection device 15 detects vibration of a rolling bearing 17, and vibration occurring when passing through a rail joint or a switch point of the travelling rails 20, etc. A pair of axle boxes 3 are provided at a lower portion of the bogie 2 so as to be spaced apart from each other in the vehicle width direction, and one or more rolling bearings 17 are housed in each of these axle boxes 3. Two axles 18 are provided to one bogie 2 so as to be parallel to each other. A plurality of rolling bearings 17 are, for example, housed in one axle box 3 so as to be spaced apart from each other at a predetermined interval. Each rolling bearing 17 is, for example, a ball bearing, a cylindrical roller bearing, or a tapered roller bearing.

The outer ring of the rolling bearing 17 is fitted to the inner peripheral surface of the axle box 3, and the axle 18 is fitted to the inner ring of each rolling bearing 17. A wheel 19 is mounted on each of both axial end portions of each axle 18. These wheels 19 are rotatably supported by the rolling bearings 17 and thus can run on the two rails 20 that are laid on a track so as to be parallel to each other. A bolt 21 composed of a magnetic body is fastened to the axle box 3. The bolt 21 is, for example, a hexagon headed bolt. The head surface of the hexagon headed bolt exposed from the axle box 3 can attract a permanent magnet 12 of the vibration detection device 15, whereby the vibration detection device 15 can be fixed.

As shown in FIG. 3, the vibration detection device 15 includes, for example, a case (not shown), a vibration detection element 23, a processing circuit 24, the permanent magnet 12 (FIG. 4), a power supply circuit 25, a recording unit 40, and a recording medium 22. For example, the processing circuit 24 mounted on a printed board is housed within the case. The processing circuit 24 has a plurality of electronic components, and these electronic components are soldered to a single surface or both surfaces of the printed board. As the printed board, for example, a glass-containing epoxy resin having high rigidity is desirable.

The vibration detection element 23 for detecting an operating state of the rolling bearing 17 and a holder composed of a magnetic body are mounted at one axial end portion of the case. The vibration detection element 23 is, for example, a piezoelectric acceleration sensor. By using the piezoelectric vibration detection element 23, vibration in a wide range can be detected. Within the case, a lead wire is connected from a lead terminal of the vibration detection element 23 to a connection terminal provided to the processing circuit 24.

As shown in FIG. 4, the permanent magnet 12 is provided at an end portion of the holder and attracted by the head surface of the bolt 21 at the axle box 3, whereby the vibration detection device 15 is fixed. Accordingly, the vibration detection device 15 is detachably mounted on the head surface of the bolt 21 by the permanent magnet 12. A plurality of the vibration detection devices 15 are desirably mounted above and/or below the axle boxes 3.

Figure 6:
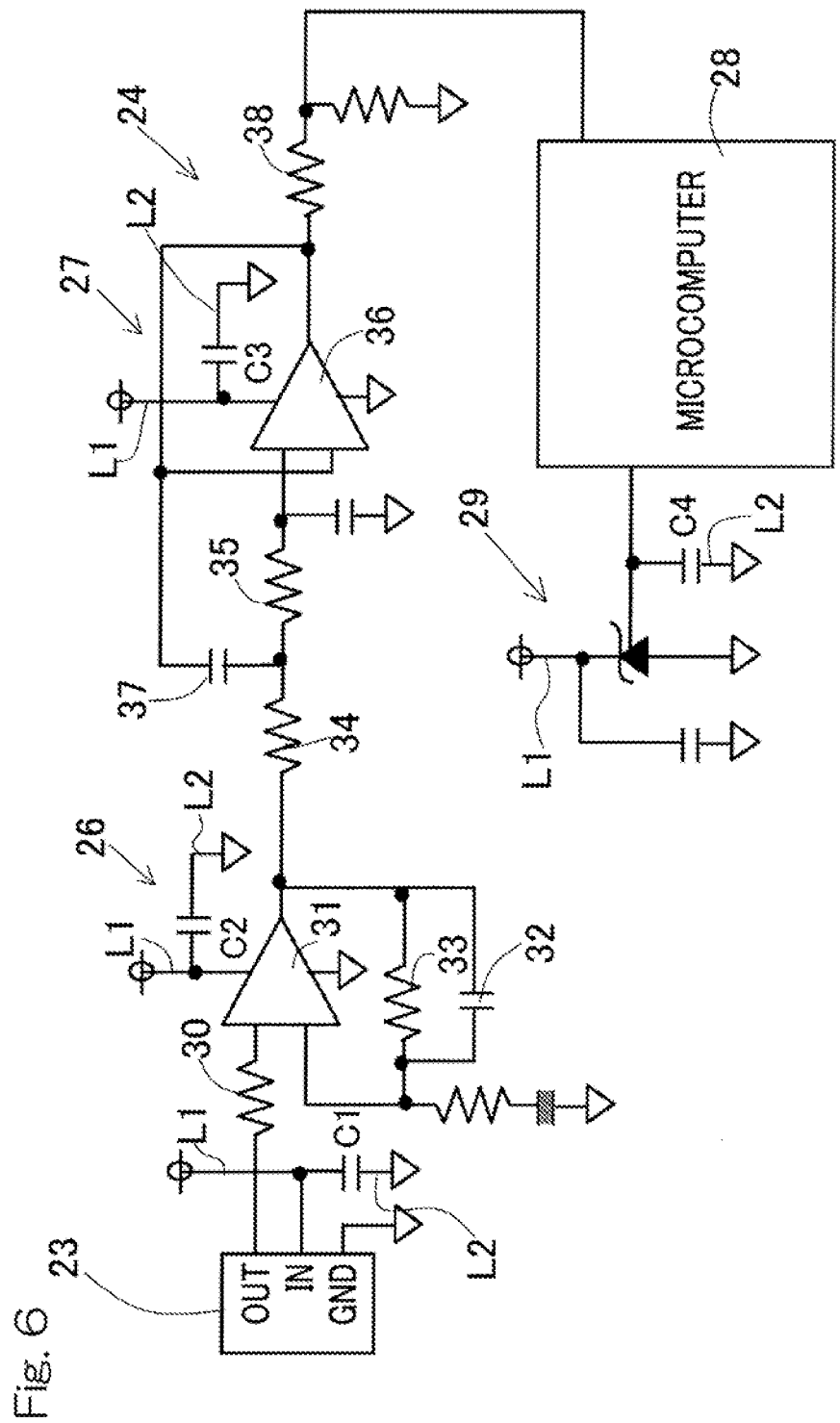
FIG. 6 is a circuit diagram schematically showing a processing circuit of the bearing abnormality sensing system in FIG. 1.

FIG. 6 is a circuit diagram schematically showing the configuration of the processing circuit 24 of the vibration detection device.

The processing circuit 24 includes an operational amplifier circuit 26, a filter circuit 27, a microcomputer 28, and a reference voltage circuit 29. An output signal of the vibration detection element 23 is inputted from the operational amplifier circuit 26 via the filter circuit 27 to the microcomputer 26. For extracting frequencies around a bearing natural frequency that include the bearing natural frequency, the filter circuit 27 is configured by a bandpass filter for which a certain frequency band is set. The filter circuit 27 may be configured by a combination of a high-pass filter and a low-pass filter.

Preferably, the microcomputer 28 is normally in a sleep state, and becomes activated at a point of time when a signal is received. An analog output signal of the vibration detection element 23, which is an acceleration sensor, is A/D converted within the microcomputer 28 and then recorded in the recording unit 40 as shown in FIG. 3. Thereafter, the data is transferred from the recording unit 40 to the recording medium 22. The recording unit 40 is, for example, a random access memory (abbreviated as RAM) capable of rewriting data. The recording medium 22 may be, for example, a micro SD card, which can make the vibration detection device 15 compact.

As shown in FIG. 6, a power supply voltage is supplied to the vibration detection element 23 and the processing circuit 24. The power supply voltage is adjusted to a desired voltage. Power supply bypass capacitors C1 to C4 are connected to the vibration detection element 23 or the processing circuit 24. Each of the power supply bypass capacitors C1 to C4 is connected between a power supply line L1 and a GND (ground) line L2 for the purpose of bypassing noise superimposed on a DC power supply to supply a stable power supply voltage and for the purpose of reducing fluctuations of the power supply voltage.

The power supply bypass capacitor C1 is connected between the power supply line L1 and the CND line L2 from the vibration detection element 23. By the power supply bypass capacitor C1, a stable power supply voltage is supplied to the vibration detection element 23 and fluctuations of the supplied power supply voltage are reduced. The analog output signal from the vibration detection element 23 is inputted via a resistor 30 to a first input terminal of an operational amplifier 31 in the operational amplifier circuit 26.

The power supply bypass capacitor C2 is connected between the power supply line L1 for the operational amplifier 31 and the CND line L2. By the power supply bypass capacitor C2, a stable power supply voltage is supplied to the operational amplifier circuit 26 with noise bypassed, and fluctuations of the supplied power supply voltage are reduced. An output signal from the operational amplifier 31 is inputted via a capacitor 32 and a resistor 33 connected in parallel to the capacitor 32, to a second input terminal of the operational amplifier 31. The operational amplifier 31 amplifies and outputs the difference between inputs (an inverting input, a non-inverting input) of the two input terminals.

The amplified output signal is inputted via series-connected resistors 34 and 35 to a first input terminal of an operational amplifier 36 in the filter circuit 27. The power supply bypass capacitor C3 is connected between the power supply line L1 for the operational amplifier 36 and the GND line L2. By the power supply bypass capacitor C3, a stable power supply voltage is supplied to the filter circuit 27 with noise bypassed, and fluctuations of the supplied power supply voltage are reduced. An output signal from the operational amplifier 36 is inputted to a second input terminal of the operational amplifier 36 and also returned between the resistors 34 and 35 via a capacitor 37.

The filter circuit 27 extracts only a predetermined frequency band corresponding to natural vibration of the bearing and eliminates undesired frequency bands. During normal operation of the bearing, natural vibration of the bearing is caused by rotation and passing of rolling elements. When an abnormality occurs in a rolling surface of the bearing, peaks of vibration are superimposed in a rolling element passing period corresponding to a bearing rotational frequency. Thus, the filter circuit 27 eliminates or attenuates a frequency component of the output signal from the operational amplifier circuit 26 other than a natural vibration component of the bearing so as to accurately extract a frequency component due to an abnormality. The bearing rotational frequency is, for example, determined so as to correspond to a rotational frequency of a drive motor of the railway vehicle.

The analog output signal having passed through the filter circuit 27 is inputted via a resistor 38 and the like to the microcomputer 28. The analog output signal is A/D converted within the microcomputer 28 and then temporarily recorded in the recording unit 40 (FIG. 3). The reference voltage circuit 29 is connected to the microcomputer 28 such that an excessive voltage is not applied to the microcomputer 28. The power supply bypass capacitor C4 is connected between the power supply line L1 and the GND line L2 of the reference voltage circuit 29. By the power supply bypass capacitor C4, a stable power supply voltage is supplied to the reference voltage circuit 29 with noise bypassed, and fluctuations of the supplied power supply voltage are reduced.

As shown in FIG. 3, the measurement start command transmitting/receiving device (reception response detection start module) 13 in each slave unit set 5 includes a power supply 41, a power supply circuit 42, a communication circuit 43, a communication module 44, and an antenna 14. That is, the measurement start command transmitting/receiving device (reception response detection start module) 13 is composed of a so-called communication device including a processor and a memory. A power supply voltage supplied from the power supply 41 is adjusted to a desired voltage by the power supply circuit 42 and supplied to the communication circuit 43, the communication module 44, and the antenna 14.

The detection start signal from the measurement start command transmitting device 4 is received by the antenna 14 of the measurement start command transmitting/receiving device 13 and then transmitted via the communication circuit 43 and the electric wire 16 to the vibration detection device 15, which causes the vibration detection device 15 to detect vibration of the rolling bearing.

Figure 7:
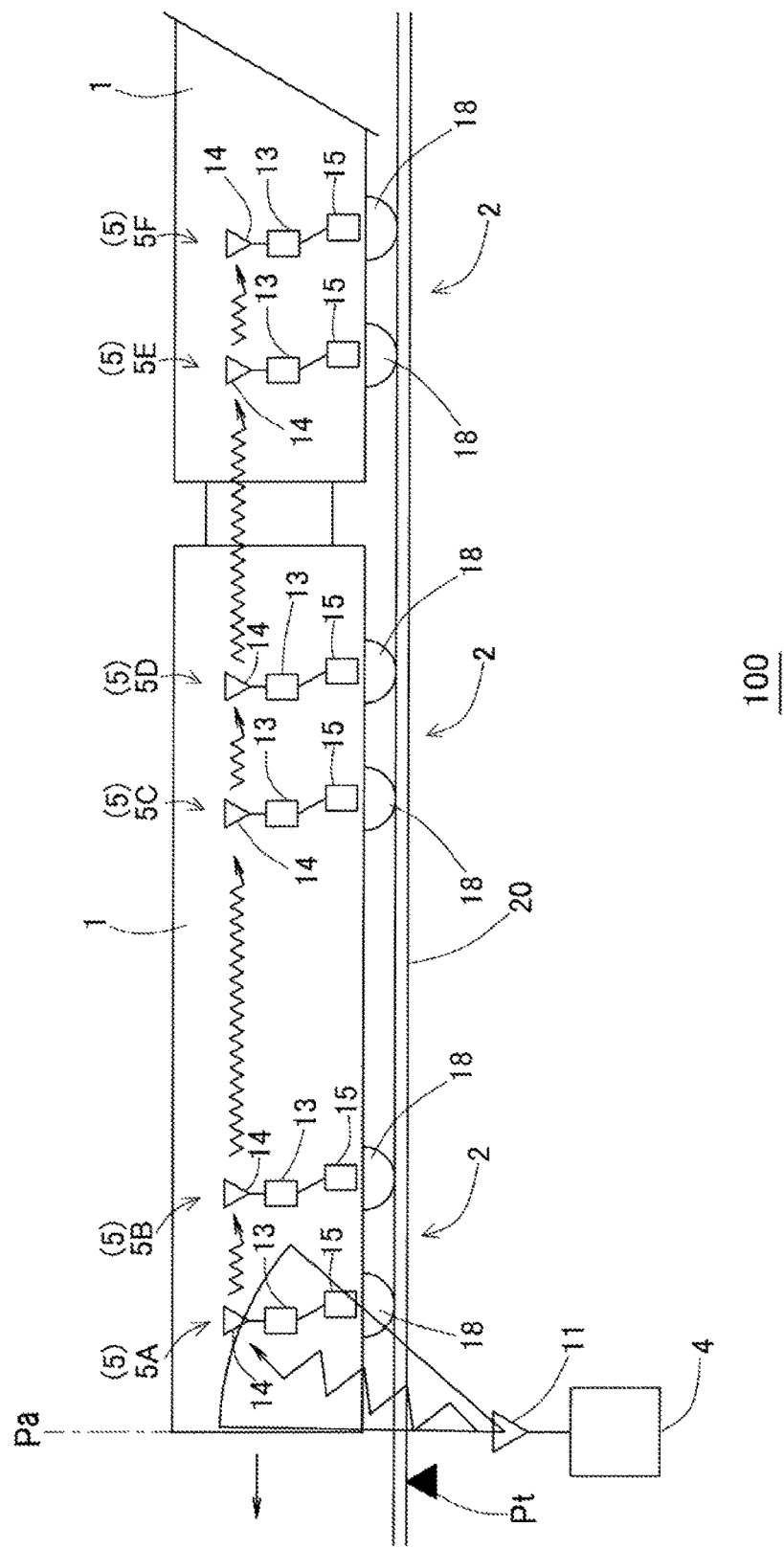
FIG. 7 is a diagram showing an example of vibration measurement by the bearing abnormality sensing, system in FIG. 2.

FIG. 7 is a diagram showing an example of vibration measurement by the bearing abnormality sensing system 100. In this embodiment, a switch point Pt is provided at one location within a running range of the railway vehicle. For causing the railway vehicle (cars) 1 to run in the vehicle site (railway yard) when the railway vehicle 1 is inspected, the measurement start command transmitting device 4 and the multiple measurement start command transmitting/receiving devices 13 are all turned on beforehand. Next, the railway vehicle 1 is caused to run along the travelling rails 20 at a predetermined vehicle speed (e.g., not lower than 25 km/h and not higher than 35 km/h). The measurement start command transmitting/receiving device (reception response detection start module) 13 of a first slave unit set 5A receives the radio wave of the detection start signal from the measurement start command transmitting device 4, which is installed in the vicinity of the travelling rails 20, when the axle box at a bogie 2 placed at the forward part of the leading car passes through a position Pa just before the switch point of the travelling rails 20. In the axle box the rolling bearing that is the initial vibration detection target is provided As a result, the vibration detection device 15 of the first slave unit set 5A, which is connected to the measurement start command transmitting/receiving device 13, detects vibration of the rolling bearing housed in the axle box at the leading car, that is, into the corresponding axle box. Furthermore, the measurement start command transmitting/receiving device 13 of the first slave unit set 5A transmits the radio wave of the detection start signal to the measurement start command transmitting/receiving device 13 of a second slave unit set 5B, and the vibration detection device 15 of the second slave unit set 5B detects vibration of the rolling bearing housed in the corresponding axle box.

Subsequently, similarly, each measurement start command transmitting/receiving device 13 transmits the radio wave of the detection start signal to the measurement start command transmitting/receiving device 13 immediately rearward thereof, whereby the radio wave of the detection start signal is sequentially transmitted to the measurement start command transmitting/receiving devices 13 of subsequent slave unit sets 5C, 5D, 5E, and 5F and vibration of the rolling bearing that is a vibration detection target housed in the axle box corresponding to each slave unit set 5 is sequentially detected. After the railway vehicle 1 is caused to run in this manner, the measurement start command transmitting device 4 and the multiple measurement start command transmitting/receiving devices 13 are turned off. Detection data detected by each vibration detection device 15 is transferred to the recording medium 22 as shown in FIG. 2, and then the analysis device 6 determines an abnormality in the rolling bearings. For example, an amplitude threshold may be stored in advance in a memory of the analysis device 6, which is implemented in a personal computer. When a peak of a vibration waveform, which is the detection data, exceeds the amplitude threshold, an abnormality in the rolling bearing may be determined. Alternatively, the processor of the personal computer may determine an abnormality for a vibration waveform of the bearing on the basis of the result of an operation such as comparison. The vibration waveform may be processed so as to remain as an analog signal, or may be A/D converted and processed as a digital signal.

With the railway vehicle bearing abnormality sensing system 100 according to this embodiment described above, at a time that does not coincide with the time when passing through a rail joint or a switch point, the reception response detection start module 13 receives the detection start signal from the measurement start command transmitting device 4 and causes the vibration detection device 15 to detect vibration of the rolling bearing 17, whereby an undesired vibration waveform other than a vibration waveform attributed to a bearing abnormality does not appear in the detection data. Thus, the detection data that is the vibration waveform attributed to the bearing abnormality is clearly identified.

The analysis device 6 determines an abnormality in the rolling bearing 17 on the basis of such detection data. Therefore, the abnormality determination for the railway vehicle bearing 17 can be accurately performed with the detection data that does not include the vibration waveform attributed to passing through the rail joint or the switch point of the travelling rails 20.

The measurement start command transmitting/receiving device 13 that has received the detection start signal has a function to sequentially transmit the detection start signal to the measurement start command transmitting/receiving device 13 corresponding to the axle box in which the rolling bearing that is the subsequent vibration detection target is provided. Thus, a measuring person can omit an operation process on each of the measurement start command transmitting/receiving devices 13 corresponding to the subsequent vibration detection targets, by installing and turning on the measurement start command transmitting device 4 and the like. Therefore, simple operability is achieved. In addition, since vibration measurement is started by the measurement start command transmitting/receiving device 13 automatically receiving the radio wave of the detection start signal, variations of the measurement condition are reduced.

A railway vehicle bearing abnormality sensing system according to a second embodiment will be described.

In the following description, portions corresponding to the matters described in the preceding embodiment are designated by the same reference signs in this embodiment, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 8:
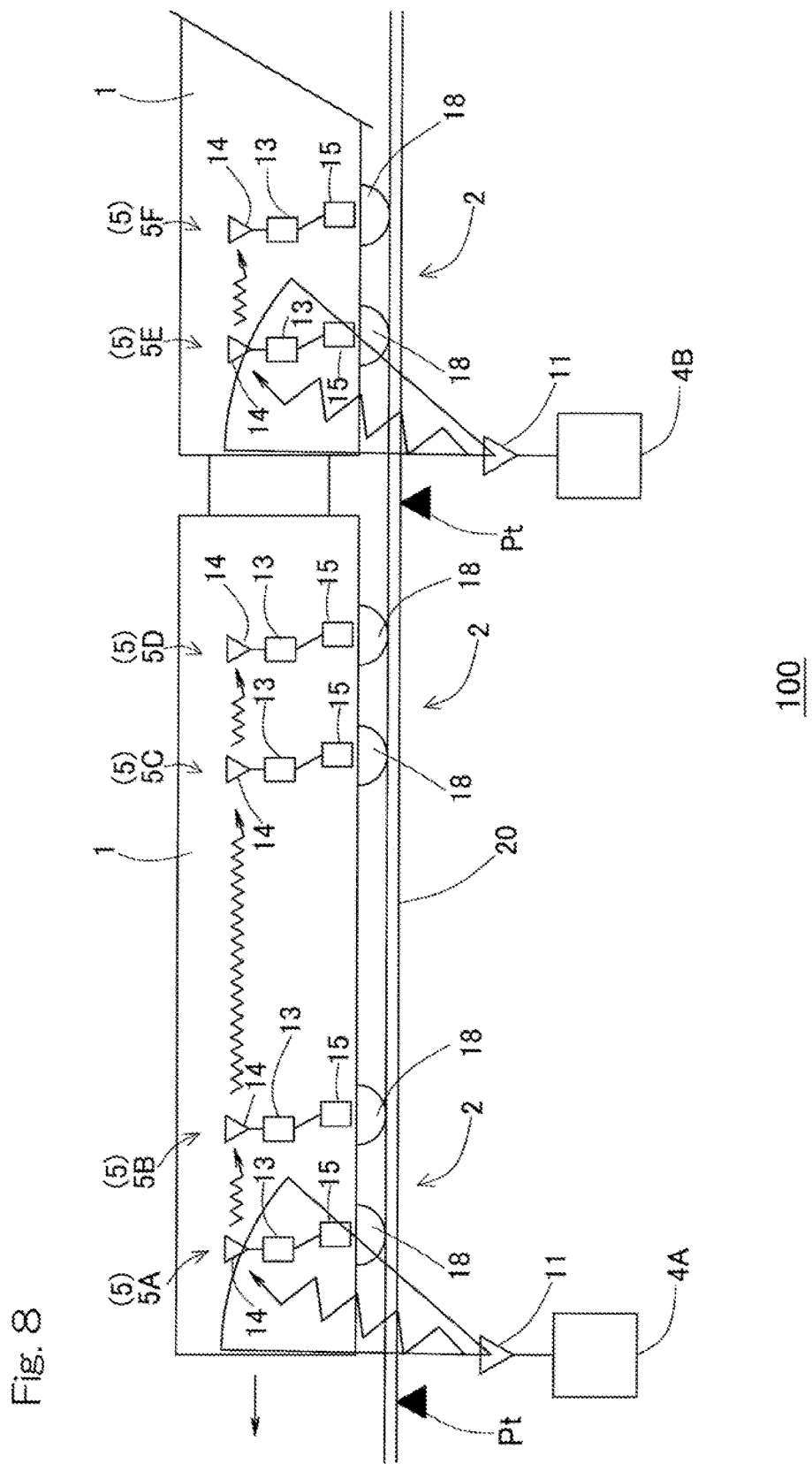
FIG. 8 is a diagram showing an example of vibration measurement by the railway vehicle bearing abnormality sensing system according to the second embodiment.

FIG. 8 is a diagram showing an example of vibration measurement by the bearing abnormality sensing system 100 according to the second embodiment. In this embodiment, a switch point Pt is provided at each of two locations that are within the running range of the railway vehicle 1, and the interval between these switch points Pt is substantially equal to the length of a single car 1. First and second measurement start command transmitting devices 4A and B are installed in corresponding relation to the switch points Pt at the respective two locations. In this case, settings are made such that at the leading car 1, the detection start signal is transmitted sequentially from the first measurement start command transmitting device 4A to the first slave unit set 5A, from the first slave unit set 5A to the second slave unit set 5B, from the second slave unit set 5B to the third slave unit set 5C, and from the third slave unit set 5C to the fourth slave unit set 5D and vibration measurement of the rolling bearing that is each vibration detection target is started.

Similarly to the first slave unit set 5A, upon reception of the detection start signal from the second measurement start command transmitting device 4B, the fifth slave unit set 5E at the subsequent car 1 starts vibration measurement of the rolling bearing that is a vibration detection target thereof. Similarly as at the leading car, settings are made such that the fifth slave unit set 5E transmits the detection start signal to the sixth slave unit set 5F. By making the settings as described above, the total sum of time lags in measurement (delays of time taken for transmission) between the slave unit sets due to transmission times can be reduced. In addition, the time lags in measurement between the slave unit sets can be made constant. Thus, a delay time required for avoiding coincidence of a measurement time of the subsequent slave unit set and passing through a rail joint or a switch point may not be necessary.

Although not shown, at the time when each axle box at each vehicle bogie passes through the vicinity of each of the measurement start command transmitting devices 4A and 4B, vibration measurement may be started by each measurement start command transmitting/receiving device 13 receiving the detection start signal. That is, the interval between the measurement start command transmitting devices 4A and 4B may be substantially equal to the interval between the two bogies of a single car. One rolling bearing that is a vibration detection target is assumed to be provided to each bogie. Each of the slave unit sets 5A, . . . , 5F is set such that the slave unit set starts measurement only when the slave unit set receives the radio wave of the detection start signal transmitted from the measurement start command transmitting device 4A or 4B. The vehicle running speed is set such that the vehicle running speed is a predetermined vehicle speed when the first slave unit set 5A receives the radio wave of the detection start signal from the measurement start command transmitting device 4A.

In this case, it is not necessary to transmit the radio wave of the detection start signal from a slave unit set at a certain bogie to a slave unit set at another bogie, and vibration measurements of all the axle boxes are performed at the same time. Thus, the condition for vibration measurement is less likely to be varied.

Next, a bearing abnormality sensing system according to a third embodiment will be described.

In the following description as well, portions corresponding to the matters described in the preceding embodiments are designated by the same reference signs in this embodiment, and the redundant description thereof is omitted. When only a part of a configuration is described, the remaining part of the configuration is the same as that of the previously described embodiments unless otherwise specified. The same advantageous effects are achieved by the same configuration. In addition to the combinations of portions described specifically in each embodiment, it is also possible to partially combine the embodiments unless any problem is particularly posed due to the combination.

Figure 9:
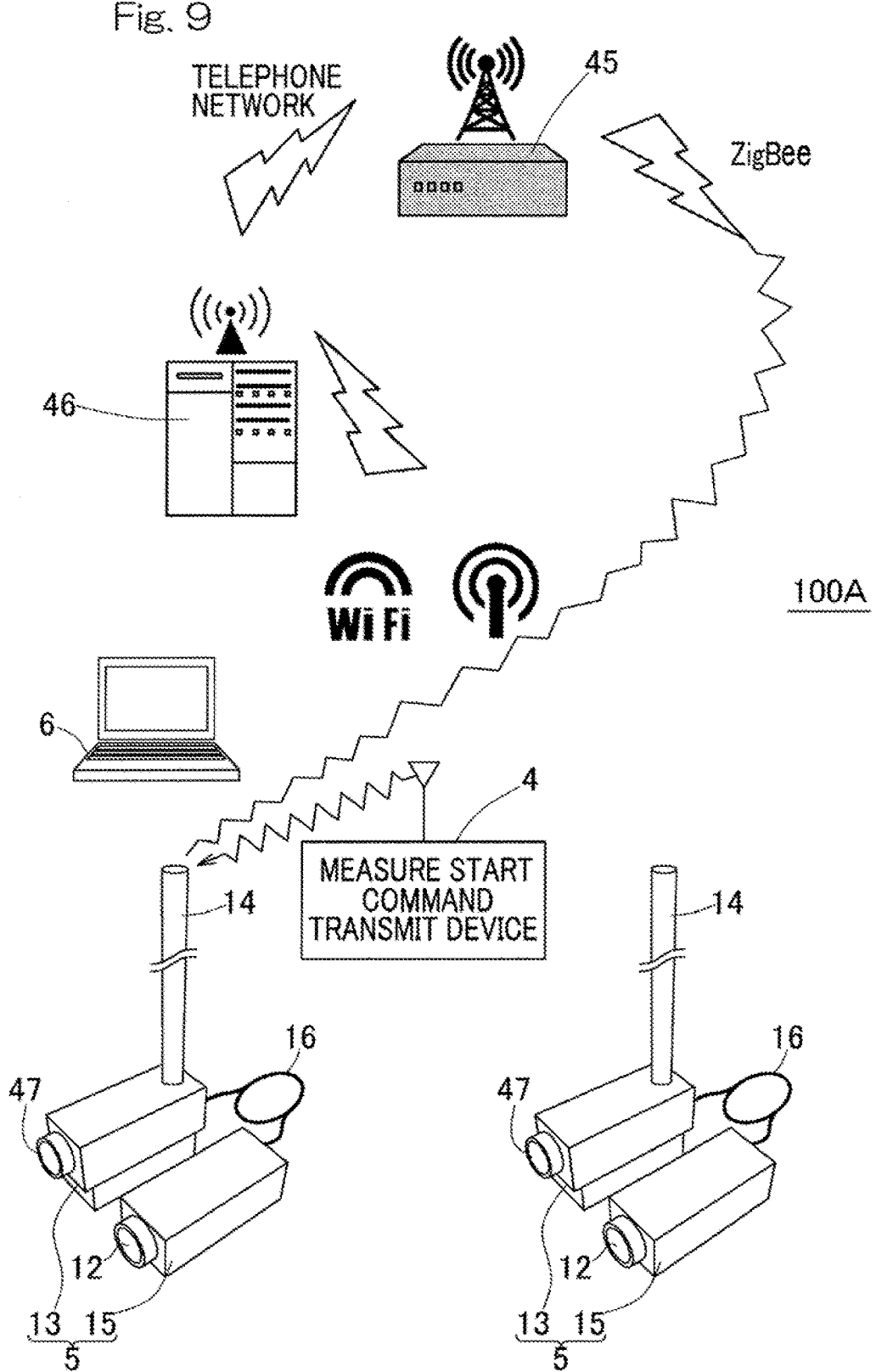
FIG. 9 is a perspective view showing the appearance of the railway vehicle bearing abnormality sensing system according to the third embodiment.

FIG. 9 is a perspective view showing the appearance of the bearing abnormality sensing system 100A according to the third embodiment. The bearing abnormality sensing system 100A includes a data collection device 45 and a data storage server 46 in addition to the bearing abnormality sensing system 100 (FIG. 2) according to the first embodiment.

Figure 10:
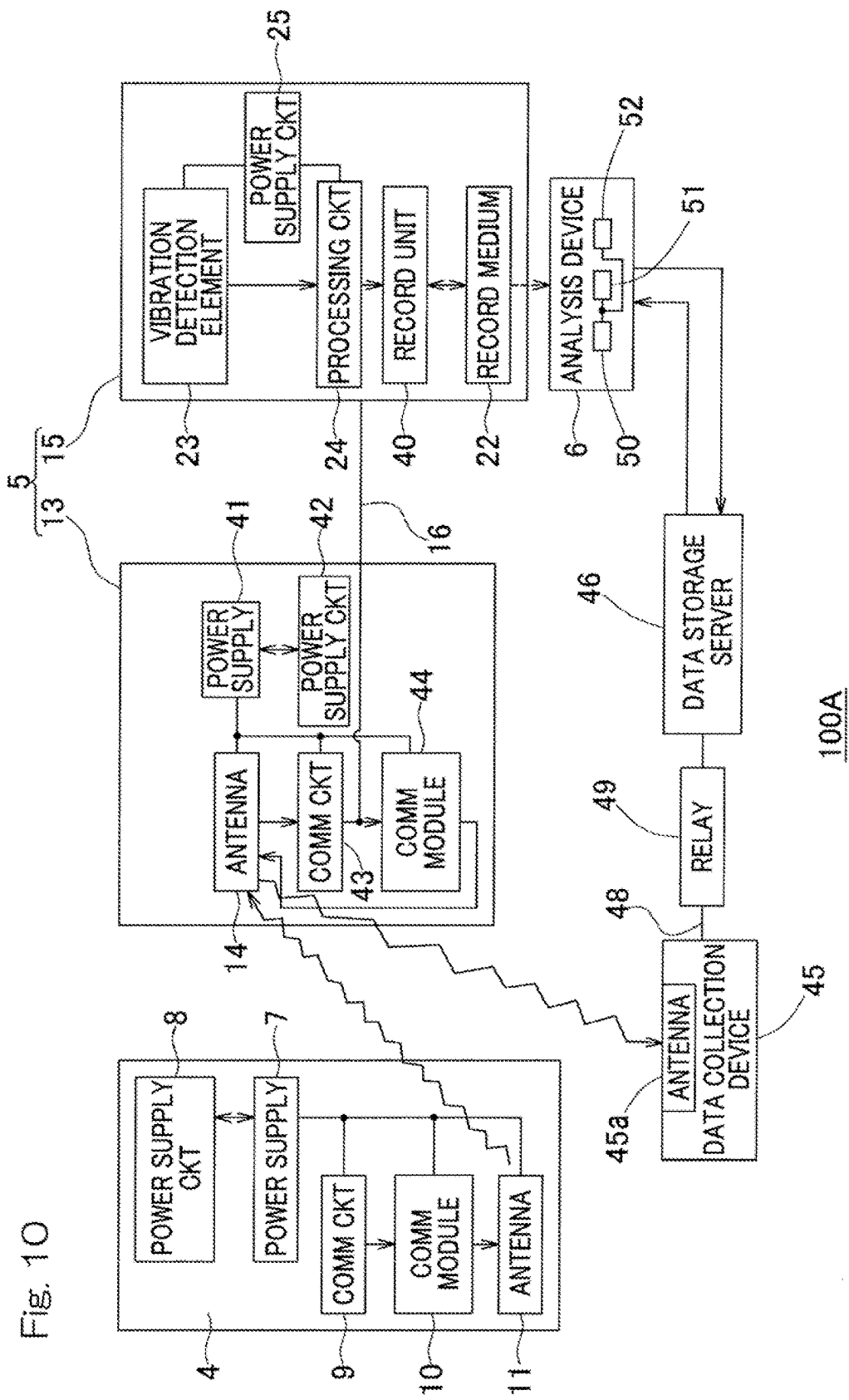
FIG. 10 is a block diagram of a control system of the bearing abnormality sensing system in FIG. 9.

FIG. 10 is a block diagram of a control system of the bearing abnormality sensing system.

The measurement start command transmitting/receiving device 13 in each slave unit set 5 includes, for example, a case that is not shown, a power supply 41, a power supply circuit 42, a communication circuit 43, a communication module 44, an antenna 14, and a permanent magnet 47 (FIG. 9). The power supply 41, the power supply circuit 42, the communication circuit 43, and the communication module 44 are housed in the case. The permanent magnet 47 (FIG.

9) is provided at a portion of the case, and is attracted and fixed to the head surface of a bolt near the axle box. The antenna 14 may be fixed to a car body that is separate from the case, by using an adhesive tape or the like as appropriate.

A power supply voltage supplied from the power supply 41 is adjusted to a desired voltage by the power supply circuit 42 and supplied to the communication circuit 43, the communication module 44, and the antenna 14.

In this embodiment, the recording medium does not necessarily need to be a detachable/attachable recording medium, that is, a recording medium such as a micro SD card as described in the first embodiment.

As shown in FIG. 10, detection data detected by the vibration detection device 15 is recorded in the recording unit 40 of the microcomputer 28 (see FIG. 6 described for the first embodiment) within the vibration detection device 15 and then transferred to the measurement start command transmitting/receiving device 13 via the electric wire 16. The microcomputer 28 (FIG. 6) within each vibration detection device 15 is caused to store an ID associated with each vibration detection device, that is, each slave unit set, and the detection data is transferred together with the ID. The measurement start command transmitting/receiving device 13 keeps the state where the antenna 14 is capable of transmitting the radio wave. The measurement start command transmitting/receiving device 13 has a function as a detection data transmitting device to transmit the detection data, as well as the function as the reception response detection start module described above.

The data collection device 45 is installed at a place apart from the railway vehicle, for example, in the vicinity of the travelling rails 20 (FIG. 11) and frontward of the measurement start command transmitting device 4 in the vehicle running direction. The data collection device 45 includes an antenna 45a for receiving the detection data transmitted from each measurement start command transmitting/receiving device 13. When the measurement start command transmitting/receiving device 13 passes through the vicinity of the data collection device 45, the data collection device 45 receives and collects the detection data by radio via the antenna 45a.

Thereafter the detection data and the ID are transferred via, for example, a telephone network 48 and a relay 49 to the data storage server 46, and recorded therein as necessary. The analysis device 6 determines an abnormality in rolling bearings on the basis of the detection data and the ID transferred from the data storage server 46. The analysis device 6 includes a diagnosis unit 50, a storage unit 51, and a display unit 52.

When an analysis value obtained by performing frequency analysis on the detection data is equal to or greater than a threshold, the diagnosis unit 50 determines that the bearing is abnormal. When the analysis value is less than the threshold, the diagnosis unit 50 determines that the bearing is normal. The storage unit 51 stores an analysis result obtained from the diagnosis by the diagnosis unit 50. The display unit 52 displays the analysis result obtained from the diagnosis by the diagnosis unit 50. The analysis result obtained from the diagnosis by the diagnosis unit 50 may be transferred to the data storage server 46 and recorded therein together with the ID.

In this case, for example, the analysis result recorded in the data storage server 46 can be confirmed by accessing the data storage server 46 with various electronic equipment such as a personal computer, a mobile phone, a smartphone, a PDA, or the like and extracting the analysis result with the ID as a key. As the analysis result, not only a person who manages this apparatus but also a person who manages peripheral apparatuses or components including the railway cars can easily acquire maintenance information such as bearing replacement information and information such as ordering arrangement information by accessing the data storage server 46 with various devices described above.

Figure 11:
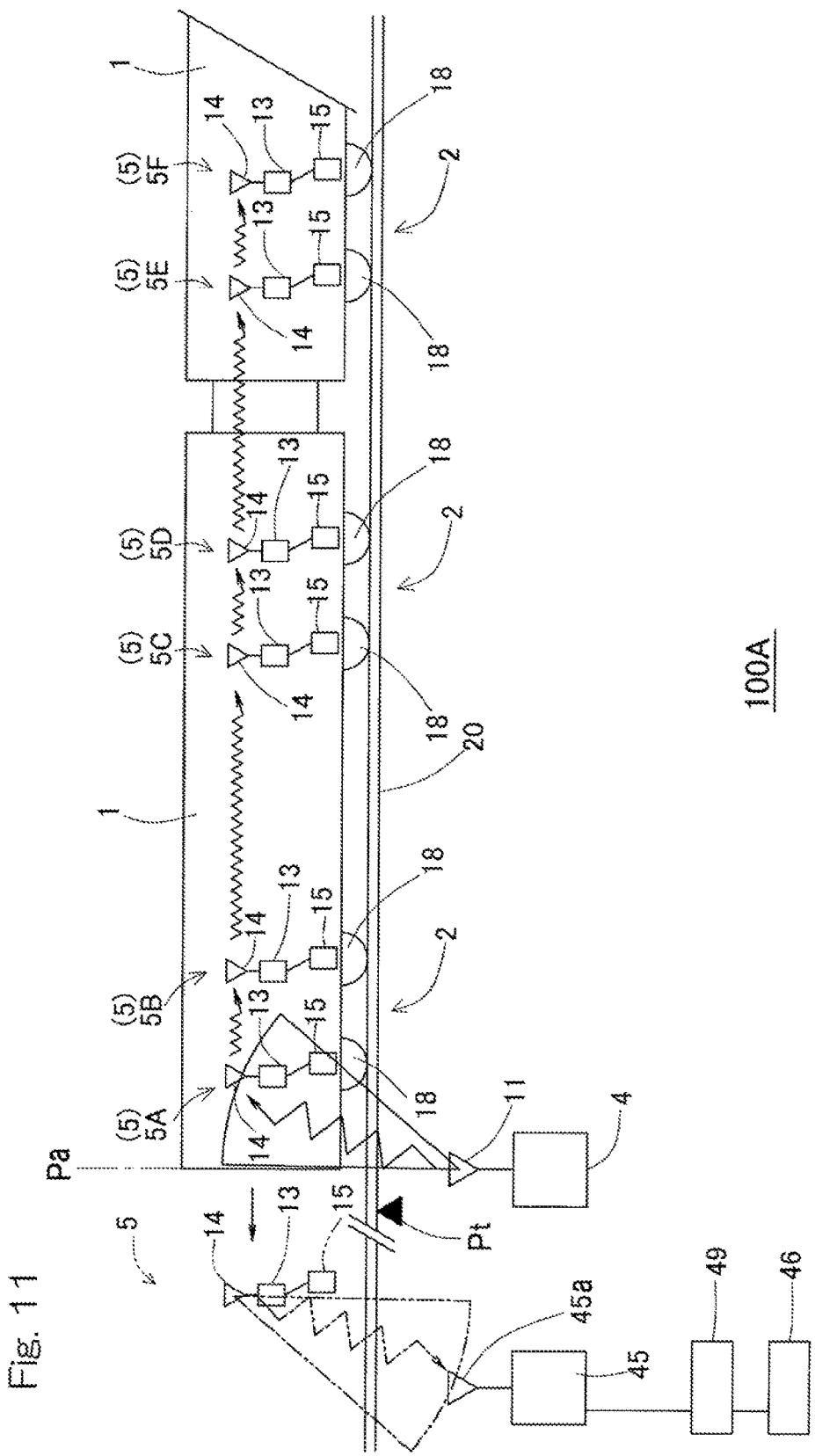
FIG. 11 is a diagram showing an example of vibration measurement by the bearing abnormality sensing system in FIG. 9.

FIG. 11 is a diagram showing an example of vibration measurement by the bearing abnormality sensing system 100A. In this embodiment, a switch point Pt is provided at one location within the running range of the railway vehicle 1. For causing the railway vehicle (cars) 1 to run in the vehicle site (railway yard) when the railway vehicle 1 is inspected, the measurement start command transmitting device 4, the multiple measurement start command transmitting/receiving devices 13, and the data collection device 45 are all turned on beforehand.

Next, the railway vehicle 1 is caused to run along the travelling rails 20 at a predetermined vehicle speed (e.g., not lower than 25 km/h and not higher than 35 km/h). The measurement start command transmitting/receiving device (reception response detection start module) 13 of the first slave unit set 5A receives the radio wave of the detection start signal from the measurement start command transmitting device 4, which is installed in the vicinity of the travelling rails 20, when the axle box at a bogie 2 placed at the forward part of the leading car 1 passes through a position Pa just Before the switch point of the travelling rails 20. In the axle box the rolling bearing that is the initial vibration detection target is provided As a result, the vibration detection device 15 of the first slave unit set 5A, which is connected to the measurement start command transmitting/receiving device 13, detects vibration of the rolling bearing housed in the axle box at the leading car, that is, into the corresponding axle box. Furthermore, the measurement start command transmitting/receiving device 13 of the first slave unit set 5A transmits the radio wave of the detection start signal to the measurement start command transmitting/receiving device 13 of the second slave unit set 5B, and the vibration detection device 15 of the second slave unit set 5B detects vibration of the rolling bearing housed in the corresponding axle box.

Subsequently, similarly, each measurement start command transmitting/receiving device 13 transmits the radio wave of the detection start signal to the measurement start command transmitting/receiving device 13 immediately rearward thereof, whereby the radio wave of the detection start signal is sequentially transmitted to the measurement start command transmitting/receiving devices 13 of the subsequent slave unit sets 5C, 5D, 5E, and 5F and vibration of the rolling bearing that is a vibration detection target housed in the axle box corresponding to each slave unit set 5 is sequentially detected. The detection data detected by each vibration detection device 15 and the ID associated with the slave unit set 5 are recorded in the recording unit of the microcomputer within the vibration detection device 15 and then transferred to the measurement start command transmitting/receiving device 13. The measurement start command transmitting/receiving device 13 keeps the state where the antenna 14 is capable of transmitting the radio wave.

Thereafter, when the measurement start command transmitting/receiving device 13 passes through the vicinity of the data collection device 45, which is installed frontward of the measurement start command transmitting device 4 in the vehicle running direction, the data collection device 45 receives and collects the detection data and the IDs by radio. Alternatively, while the measurement start command transmitting/receiving device 13 passes through the vicinity of the data collection device 45, the measurement start command transmitting/receiving device 13 may transmit the detection data and the ID at a time when the measurement start command transmitting/receiving device 13 receives a data transmission command from the data collection device 45. After the railway vehicle 1 is caused to run in this manner, the measurement start command transmitting device 4 and the multiple measurement start command transmitting/receiving devices 13 are turned off.

With the railway vehicle bearing abnormality sensing system 100A according to this embodiment described above, the data collection device 45 receives and collects the detection data transmitted from the measurement start command transmitting/receiving devices 13, which are detection data transmitting devices, and thus, for example, unlike data transmission via a wire, a recording medium, or the like, construction for electric wires and an operation of picking out data are not required. Therefore, the detection data is easily obtained, and the cost is reduced. Since the detection data is collected by the data collection device 45 together with the ID associated with each slave unit set, it is readily identified in which axle box 3 the rolling bearing 17 is abnormal.

A railway vehicle bearing abnormality sensing system according to a fourth embodiment will be described.

In the following description, portions corresponding to the matters described in each preceding embodiment are designated by the same reference signs, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 12:
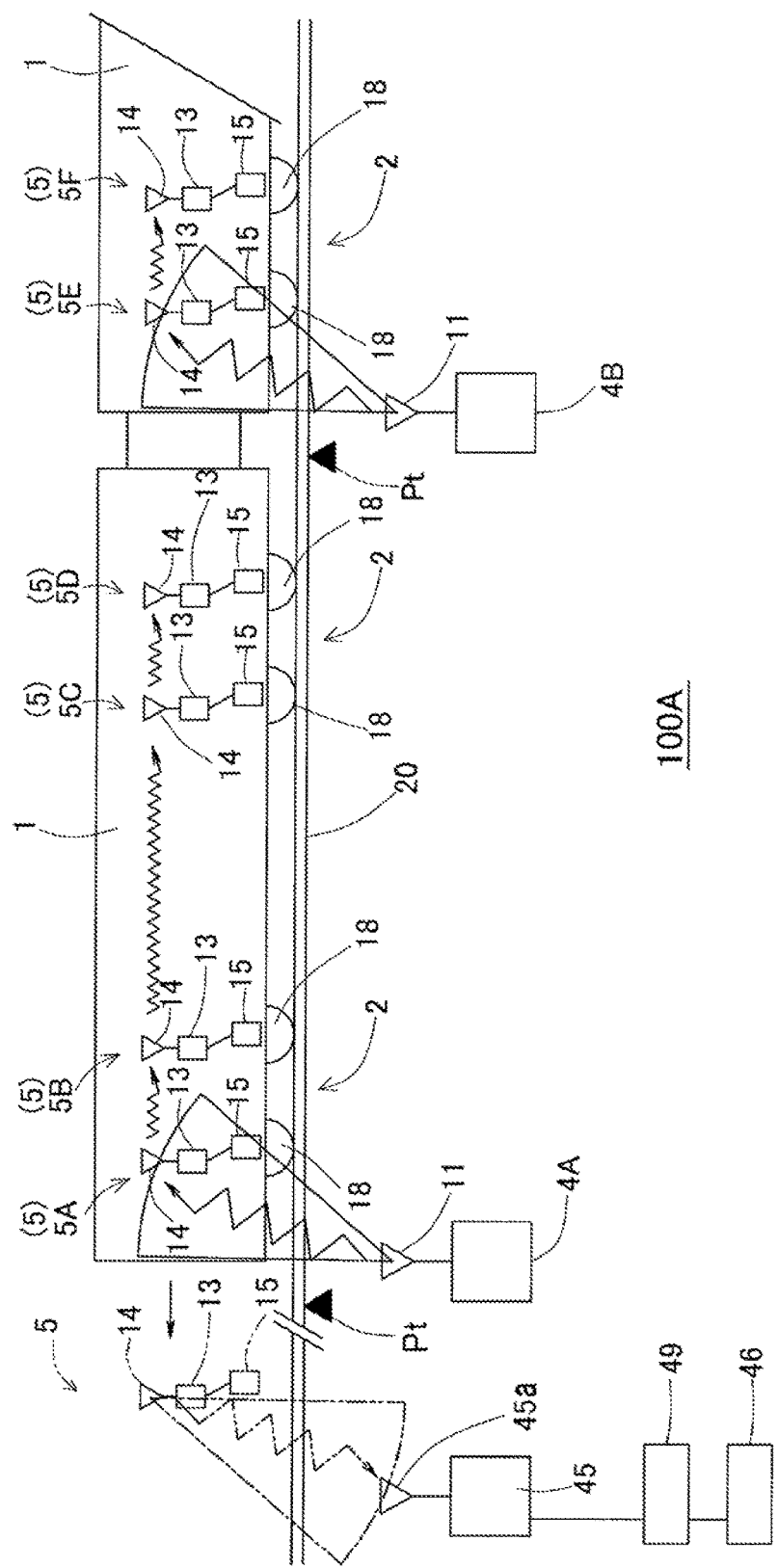
FIG. 12 is a diagram showing an example of vibration measurement by the railway vehicle bearing abnormality sensing system according to the fourth embodiment.

FIG. 12 is a diagram showing an example of vibration measurement by the bearing abnormality sensing system 100A according to the fourth embodiment. In this embodiment, a switch point Pt is provided at each of two locations that are within the running range of the railway vehicle 1, and the interval between these switch points Pt is substantially equal to the length of a single car 1. Therefore, transmission of the detection start signal and measurement of each vibration detection target are as described for the bearing abnormality sensing system according to the second embodiment.

The first and second measurement start command transmitting devices 4A and 4B are installed at such positions that the measurement start command transmitting devices 4A and 4B are not influenced by disturbance vibration before the first slave unit set 5A and the fifth slave unit set 5E pass through a rail joint or a switch point of a travelling rails at a predetermined running speed. In this case, preferably, for example, the railway vehicle 1 is caused to run at a constant vehicle speed by drive motors, and then the drive motors are non-energized to cause the railway vehicle 1 to run by the inertial force thereof. Thereafter, vibration of rolling bearings 17 are detected. Accordingly, while vibrations of rolling bearings 17 are detected, adverse noise caused by electromagnetic waves from the drive motors is reduced.

The detection data recorded in the data collection device 45 is transferred together with the ID to the data storage server 46, which is a storage device, via radio such as a telephone network. In the data storage server 46, the ID of the detection data and the bearing model number, the axle box, the vehicle number, and the date of measurement are stored so as to be associated with the detection data. The detection data and the ID stored in the data storage server 46 can be transferred to the analysis device 6 by using, for example, a wireless LAN, Wi-Fi, Bluetooth (registered trademark), a ZigBee module, or the like.

Next, a bearing abnormality sensing system according to a fifth embodiment will be described.

In the following description as well, portions corresponding to the matters described in the preceding embodiments are designated by the same reference signs in this embodiment, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 13:
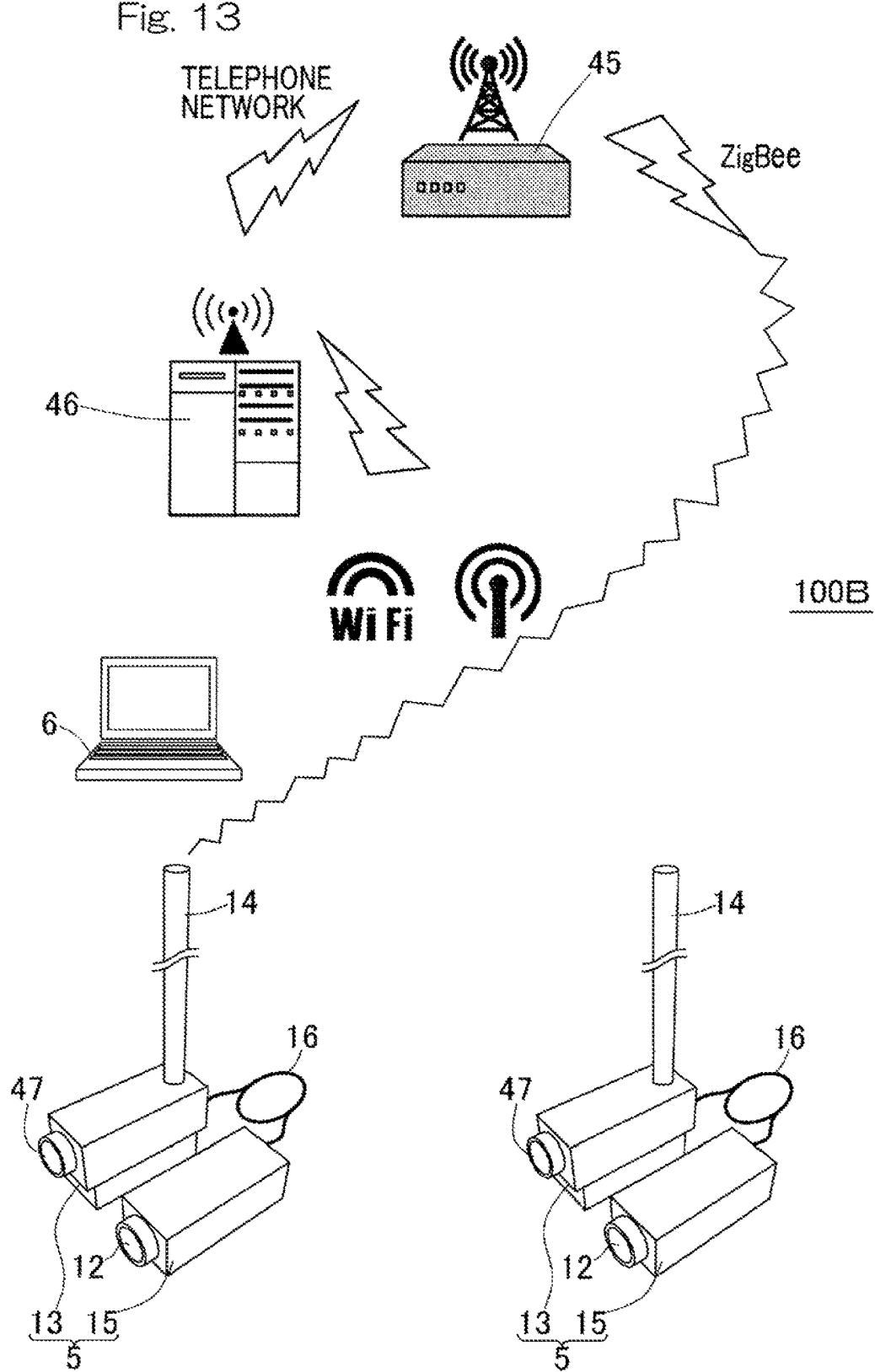
FIG. 13 is a perspective view showing the appearance of the railway vehicle bearing abnormality sensing system according to the fifth embodiment.

FIG. 13 is a perspective view showing the appearance of the bearing abnormality sensing system 100B according to the fifth embodiment. The bearing abnormality sensing system 100B is different from the bearing abnormality sensing system 100A (FIG. 9) according to the third embodiment in that the measurement start command transmitting device 4 (FIG. 9) is not included.

Figure 14:
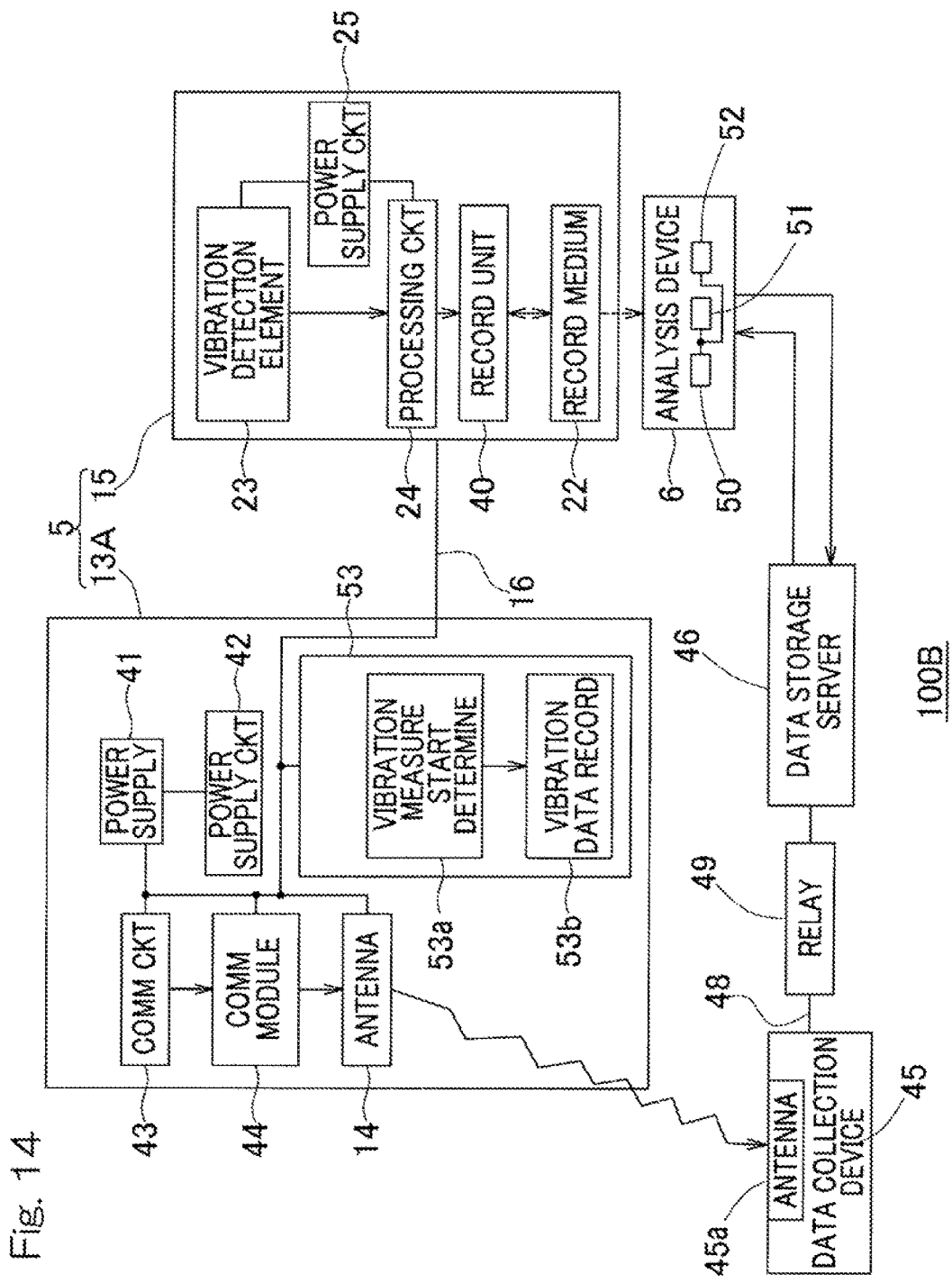
FIG. 14 is a block diagram of a control system of the bearing abnormality sensing system in FIG. 13.

FIG. 14 is a block diagram of a control system of the bearing abnormality sensing system 100B.

A measurement start command transmitting/receiving device 13A in each slave unit set 5 includes a case that is not shown, a vibration measurement start module 53, a power supply 41, a power supply circuit 42, a communication circuit 43, a communication module 44, an antenna 14, and a permanent magnet 47 (FIG. 13). That is, the measurement start command transmitting/receiving device 13A is composed of a so-called communication device including a processor and a memory. The vibration measurement start module 53, the power supply 41, the power supply circuit 42, the communication circuit 43, and the communication module 44 are housed in the case. The permanent magnet 47 (FIG. 13) is provided at a portion of the case, and is attracted and fixed to the head surface of a bolt near the axle box. The antenna 14 may be fixed to a car body that is separate from the case, by using an adhesive tape or the like as appropriate.

The vibration measurement start module 53 includes a vibration measurement start determination unit 53a implemented via the processor of the measurement start command transmitting receiving device 13A, and a vibration data recording unit 53b implemented via the memory of the measurement start command transmitting/receiving device 13A. The vibration measurement start determination unit 53a monitors a detection value of the vibration detection device 15 via the electric wire 16 or the like and determines whether the detection value is equal to or greater than a certain value. When the vibration measurement start determination unit 53a determines that the detection value is equal to or greater than the certain value, rolling bearing vibration measurement is started subsequently, and the vibration data recording unit 53b takes in and records data obtained by the measurement, as vibration data.

In this embodiment, as shown in FIG. 1 described for the first embodiment, the vibration detection device 15 detects vibration occurring when the wheel 19 of the leading ear passes through a rail joint or a switch point of the travelling rails 20. As shown in FIG. 14, when the vibration measurement start determination unit 53a determines that the detection value is equal to or greater than the certain value, rolling bearing vibration measurement is started subsequently, and the vibration data recording unit 53b takes in and records data obtained by the measurement, as vibration data.

Figure 15A:
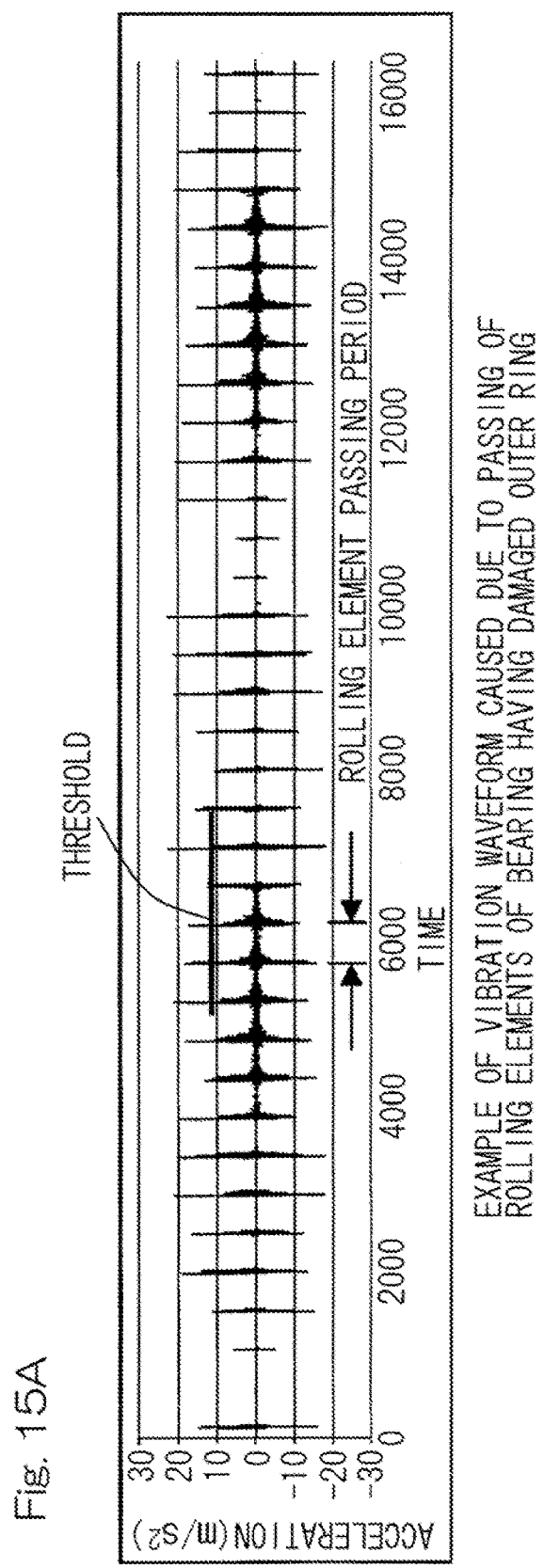
FIG. 15A is a graph showing a pattern of a vibration waveform of a disturbance detected by the bearing abnormality sensing system in FIG. 13.

FIG. 15A shows a pattern of a vibration waveform caused due to passing of rolling elements when an abnormality has occurred in a bearing outer ring, and FIG. 15B shows a pattern of a vibration waveform when a normal bearing passes through a switch point of the travelling rails. As shown in FIGS. 15A and 15B, a detection value obtained by the vibration detection device 15 when passing through a rail joint or a switch point of the travelling rails is greater than a detection value detected by the vibration detection device 15 (FIG. 14) during normal bearing rotation when passing through a travelling rail portion in which no rail joint, or switch point is present.

Detection value due to passing through a rail joint or a switch point increases in only one occasion, and the value that has rapidly increased attenuates gradually. In addition, contrary to a bearing in which an abnormality has occurred in a bearing outer ring thereof, a peak of a vibration waveform does not appear regularly like a bearing rolling element passing cycle. Thus, when a peak appears in the detection value, it is easy to identify whether the peak is attributed to passing through a rail joint or a switch point or to an abnormality that has occurred in the bearing outer ring. For example, when a detection value that is equal to or greater than the certain value has been detected once in a certain time period, it may be determined that a rail joint or a switch point of the travelling rails has been passed. The certain time period is determined, for example, in accordance with the vehicle speed of the railway vehicle.

As shown in FIG. 14, a power supply voltage supplied from the power supply 41 is adjusted to a desired voltage by the power supply circuit 42 and supplied to the communication circuit 43, the communication module 44, and the antenna 14. The detection data recorded in the vibration data recording unit 53b is converted to an electromagnetic wave having a frequency determined by the communication circuit 43 and is transmitted via the communication module 44 and the antenna 14. The measurement start command transmitting/receiving device 13A keeps the state where the antenna 14 is capable of transmitting the radio wave. The measurement start command transmitting/receiving device 13A has a function as a transmitting device to transmit the transmission data.

Regarding the components shown in FIG. 14, the components other than the components described thus function similarly as the corresponding components in the third embodiment. However, the vibration detection device 15 detects not only vibration of the rolling bearing 17 but also vibration occurring when passing through a rail joint or a switch point of the travelling rails 20 as described above. In addition, the bearing abnormality sensing system according to this embodiment does not include the measurement start command transmitting device 4 (FIG. 10). In this embodiment, the data collection device 45 is installed at a place apart from the railway vehicle, for example, in the vicinity of the travelling rails 20 (FIG. 16) and frontward of the switch point Pt (FIG. 16) in the vehicle running direction.

FIG. 16 is a diagram showing an example of vibration measurement by the bearing abnormality sensing system 100B. In this embodiment, a switch point Pt is provided at one location within the running range of the railway vehicle 1. For causing the railway vehicle (cars) 1 to run in the vehicle site (railway yard) when the railway vehicle 1 is inspected, the multiple slave unit sets 5A to 5F and the data collection device 45 are all turned on beforehand.

Next, the railway vehicle 1 is caused to run along the travelling rails 20 at a predetermined vehicle speed (e.g., not lower than 25 km/h and not higher than 35 km/h). Passing, through the switch point Pt of the travelling rails 20, of the axle box at a bogie 2 placed at the forward part of the leading car 1 is set as a trigger for vibration measurement start. In the axle box the rolling bearing that is the initial vibration detection target is provided After passing through the switch point Pt, the vibration detection device 15 of the first slave unit set 5A detects vibration of the leading bearing.

Furthermore, the measurement start command transmitting/receiving device 13A of the first slave unit set 5A transmits the radio wave of the detection start signal to the measurement start command transmitting/receiving device 13A immediately rearward thereof, whereby the radio wave of the detection start signal is sequentially transmitted to the measurement start command transmitting/receiving device 13A of the second slave unit set 5B. Accordingly, the vibration detection device 15 of the second slave unit set 5B detects vibration of the next bearing, that is, vibration of the corresponding bearing. Subsequently, similarly, the preceding measurement start command transmitting/receiving devices 13A transmit the radio wave of the detection start signal to the measurement start command transmitting/receiving devices 13A of the subsequent slave unit sets 5C, 5D, 5E, and 5F, and each vibration detection device 15 sequentially detects vibration of the bearing.

Each of the second slave unit set 5B and the subsequent slave unit sets may provide in advance a time lag, which is determined and set on the basis of the running speed of the vehicle and the distance between the slave unit sets, and measure vibration such that vibration is measured at a position that does not coincide with the switch point Pt. Alternatively, similarly to the first slave unit set 5A, also the second slave unit set 5B and the subsequent slave unit sets may measure vibration at a time when passing through the switch point Pt of the travelling rail 20.

The detection data detected by each vibration detection device 15 and the ID associated with the slave unit set 5 are recorded in the recording unit of the microcomputer within the vibration detection device 15 and then transferred to the vibration data recording unit within the measurement start command transmitting/receiving device 13A. The measurement start command transmitting/receiving device 13 keeps the state where the antenna 14 is capable of transmitting the radio wave.

Thereafter, when the measurement start command transmitting/receiving device 13A passes through the vicinity of the data collection device 45, which is installed frontward in the vehicle running direction, the data collection device 45 receives and collects the detection data and the IDs by radio. Alternatively, while the measurement start command transmitting receiving device 13A passes through the vicinity of the data collection device 45, the measurement start command transmitting/receiving device 13A may transmit the detection data and the ID at a time when the measurement start command transmitting/receiving device 13 receives a data transmission command from the data collection device 45. After the railway vehicle 1 is caused to run in this manner, the multiple measurement start command transmitting/receiving devices 13A are turned off.

With the railway vehicle bearing abnormality sensing system 100B according to this embodiment described above, a point of time when a vibration detection value that is attributed to a rail joint or a switch point and is equal to or greater than the certain value is detected is used as a reference, and vibration measurement of the rolling bearing 17 is started after this point of time. Thus, it is not necessary to additionally provide a command device or the like for starting vibration measurement. Accordingly, the entire configuration of the apparatus is simplified, and the cost is reduced.

Since the vibration detection device 15 obtains, as vibration data of the rolling bearing 17, a detection value detected after the point of time when the detection value that is attributed to a rail joint or a switch point and equal to or greater than the certain value is detected, a vibration waveform other than a vibration waveform attributed to a bearing abnormality does not appear, so that the detection data that is the vibration waveform attributed to the bearing abnormality is clearly identified. Therefore, the abnormality determination for the railway vehicle bearing 17 can be accurately performed with the detection data that does not include the vibration waveform attributed to passing through a rail joint or a switch point of the travelling rails 20.

A railway vehicle bearing abnormality sensing system according to a sixth embodiment will be described.

In the following description, portions corresponding to the matters described in each preceding embodiment are designated by the same reference signs, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

FIG. 17 is a diagram showing an example of vibration measurement by the bearing abnormality sensing system 100B according to the sixth embodiment. In this embodiment, a switch point Pt is provided at each of two locations that are within the running range of the railway vehicle 1, and the interval between these switch points Pt is substantially equal to the length of a single car 1. After the axle box at a bogie at the forward part of the leading car passes through the switch point Pt at the first location on the travelling rails 20, the vibration detection device of the first slave unit set 5A, which is mounted on a hexagon headed bolt at the axle box, measures vibration of the leading bearing.

In this case, similarly as in the fifth embodiment shown in FIG. 16, settings are made such that the detection start signal is transmitted sequentially from the first slave unit set 5A to the second slave unit set 5B, from the second slave unit set 5B to the third slave unit set 5C, and from the third slave unit set 5C to the fourth slave unit set 5D so that measurement of each vibration detection target is started. The filth slave unit set 5E at the subsequent car 1 is set such that the fifth slave unit set 5E starts measurement and transmits the detection start signal to the sixth slave unit set 5F after passing through the switch point Pt at the first location. By making such settings, measurements by the respective slave unit sets 5A to 5F are performed at substantially the same time.

Each of the slave unit sets 5A to 5T that have passed through the switch point Pt at the first location and have measured vibration of the bearing subsequently passes through the switch point Pt at the second location. Since each slave unit set has measured vibration of the bearing after passing through the switch point Pt at the first location, each slave unit set preferably does not measure vibration of the bearing after passing through the switch point Pt at the second location.

Measurement of bearing vibration by each of the slave unit sets 5A to 5F is performed at a predetermined running speed and at a position that is not influenced by disturbance vibration, not when passing over a rail joint or the switch point Pt of the travelling nails 20. In addition, preferably, for example, the railway vehicle 1 is caused to run at a constant vehicle speed by the drive motors, and then the drive motors are non-energized to cause the railway vehicle 1 to run by the inertial force thereof. As a result, during detecting vibration of each rolling bearing 17, a possibility is eliminated that the vibration detection device receives electromagnetic noise generated by the drive motors.

The vibration measurement start module is provided in the measurement start command transmitting/receiving device of each slave unit set, but it is not limited to this example. For example, the vibration measurement start module may be provided in the vibration detection device of each slave unit set.

REFERENCE SIGNS

1 railway vehicle
2 bogie
3 axle box
4 measurement start command transmitting device
6 analysis device
13 measurement start command transmitting/receiving device (reception response detection start module)
15 vibration detection device
17 rolling bearing
20 travelling rail

What is claimed is:

1. A railway vehicle bearing abnormality sensing system for sensing an abnormality in a plurality of rolling bearings housed in at least one axle box when the railway vehicle runs on travelling rails, the railway vehicle including at least one bogie, the at least one bogie including the at least one axle box, one or more of the plurality of rolling bearings being associated with one of the at least one axle box, the railway vehicle bearing abnormality sensing system comprising:

a plurality of vibration detection devices each configured to detect vibration of an associated one of the plurality of rolling bearings;

an analysis device configured to determine an abnormality in the rolling bearings on the basis of pieces of detection data, each piece indicating the vibration of the rolling bearing detected by the associated vibration detection device;

a plurality of reception response detection start modules connected to the vibration detection devices, respectively, each reception response detection start module causing the connected vibration detection device to detect vibration of the associated rolling bearing when receiving a detection start signal; and at least one measurement start command transmitting device installed apart from the railway vehicle and configured to transmit the detection start signal to the reception response detection start modules, a location where the measurement start command transmitting device is installed being a position that allows the reception response detection start module to receive the detection start signal transmitted from the measurement start command transmitting device when the reception response detection start module comes close to the measurement start command transmitting device such that the distance from the measurement start command transmitting device falls within a predetermined range, and the location being a position apart from a rail joint or a switch point in a rail longitudinal direction by a predetermined distance such that the reception response detection start module receives no detection start signal when the rolling bearing passes over the rail joint or the switch point of the traveling rails.

2. The railway vehicle bearing abnormality sensing system as claimed in claim 1, wherein
a plurality of the reception response detection start modules are provided at each of the axle boxes in which the rolling bearings are housed, the rolling bearings being vibration detection targets, and
when each reception response detection start module receives the detection start signal, each reception response detection start module transmits the detection start signal to the reception response detection start module associated with the rolling bearing that is a subsequent vibration detection target.

3. The railway vehicle bearing abnormality sensing system as claimed in claim 1, wherein
the at least one measurement start command transmitting device includes a plurality of measurement start command transmitting devices,
the rail joint or the switch point includes a plurality of rail joints or switch points provided at the travelling rails, and
the measurement start command transmitting devices are installed apart from the rail joints or the switch points, respectively, in the rail longitudinal direction by a predetermined distance.

4. The railway vehicle bearing abnormality sensing system as claimed in claim 1, wherein the travelling rails and the measurement start command transmitting device are installed in a railway yard where the railway vehicle is caused to run so as to be inspected.

5. The railway vehicle bearing abnormality sensing system as claimed in claim 1, wherein a condition for each of the plurality of vibration detection devices detecting vibration of the associated rolling bearing is that a drive motor configured to drive the railway vehicle to run is in a non-energized state and a speed of the railway vehicle falls into the range between 25 km/h and 35 km/h.

6. The railway vehicle bearing abnormality sensing system as claimed in claim 1, further comprising:
a plurality of detection data transmitting devices connected to the plurality of vibration detection devices, respectively, each detection data transmitting device configured to transmit detection data indicating the vibration of the rolling bearing detected by the associated vibration detection device; and
a data collection device installed apart from the railway vehicle and configured to receive and collect the detection data transmitted from the detection data transmitting devices, wherein
the analysis device determines an abnormality in the plurality of rolling bearings on the basis of the detection data collected by the data collection device.

7. The railway vehicle bearing abnormality sensing system as claimed in claim 6, wherein the measurement start command transmitting device and the data collection device are installed within a predetermined distance from the travelling rails in a direction orthogonal to the travelling rails.

8. The railway vehicle bearing abnormality sensing system as claimed in claim 6, wherein the data collection device receives and collects the detection data together with an ID associated with each vibration detection device.

9. The railway vehicle bearing abnormality sensing system as claimed in claim 8, further comprising a data storage server configured to store the detection data and the ID transmitted from the data collection device via a telephone network, wherein
the analysis device determines an abnormality in each rolling bearing on the basis of the detection data and the ID transmitted from the data storage server.

10. The railway vehicle bearing abnormality sensing system as claimed in claim 9, wherein the analysis result obtained from the diagnosis by the diagnosis unit is transmitted to the data storage server together with the ID.

11. The railway vehicle bearing abnormality sensing system as claimed in claim 10, further comprising electronic equipment configured to cause the analysis result recorded in the data storage server to be viewed for each ID.

12. The railway vehicle bearing abnormality sensing system as claimed in claim 8, further comprising a storage device configured to store: the ID; a bearing model number, an axle box number, and a vehicle number, the numbers being related to the rolling bearing associated with the ID; and a date at which the detection data is obtained, in connection with the detection data.

13. A railway vehicle bearing abnormality sensing system for sensing an abnormality in a plurality of rolling bearings housed in at least one axle box when the railway vehicle runs on travelling rails, the railway vehicle including at least one bogie, the at least one bogie including the at least one axle box, one or more of the plurality of rolling bearing being associated with one of the at least one axle box, the railway vehicle bearing abnormality sensing system comprising:
a plurality of vibration detection devices each configured to detect vibration of an associated one of the plurality of rolling bearings and disturbance vibration;
a plurality of vibration measurement start modules connected to the vibration detection devices, respectively, each vibration measurement start module causing the connected vibration detection device to start vibration measurement of the associated rolling bearing when the vibration detection device detects disturbance vibration; and
an analysis device configured to determine an abnormality in the rolling bearings on the basis of vibration data obtained from the started vibration measurement.

14. The railway vehicle bearing abnormality sensing system as claimed in claim 13, further comprising:
a plurality of detection data transmitting devices connected to the plurality of vibration detection devices, respectively, each detection data transmitting device configured to transmit detection data indicating the vibration of the rolling bearing detected by the associated vibration detection devices; and
a data collection device installed within a predetermined distance from the travelling rails in a direction orthogonal to the travelling rails and configured to receive and collect the detection data transmitted from the detection data transmitting devices.

15. The railway vehicle bearing abnormality sensing system as claimed in claim 14, wherein the analysis device includes:
a diagnosis unit configured to diagnose a rolling bearing as being abnormal when an analysis value obtained by performing frequency analysis of the detection data with respect to the rolling bearing is equal to or greater than a set vibration threshold, and diagnose a rolling bearing as being normal when the analysis value is less than the set vibration threshold;

a storage unit configured to store an analysis result obtained from the diagnosis by the diagnosis unit; and a display unit configured to display the analysis result obtained from the diagnosis by the diagnosis unit.

16. A railway vehicle bearing abnormality sensing system for sensing an abnormality in a plurality of rolling bearings housed in at least one axle box when the railway vehicle runs on travelling rails, the railway vehicle including at least one bogie, the at least one bogie including the at least one axle box, one or more of the plurality of rolling bearings being associated with one of the at least one axle box, the railway vehicle bearing abnormality sensing system comprising:

a plurality of vibration detection devices each configured to detect vibration of an associated one of the plurality of rolling bearings;

an analysis device configured to determine an abnormality in the rolling bearings on the basis of pieces of detection data, each piece indicating the vibration of the rolling bearing detected by the associated vibration detection device;

a plurality of reception response detection start modules connected to the vibration detection devices, respectively, each reception response detection start module causing the connected vibration detection device to detect vibration of the associated rolling bearing when receiving a detection start signal; and at least one measurement start command transmitting device installed apart from the railway vehicle and configured to transmit the detection start signal to the reception response detection start modules, wherein a plurality of the reception response detection start modules are provided at each of the axle boxes in which the rolling bearings are housed, the rolling bearings being vibration detection targets, and when each reception response detection start module receives the detection start signal, each reception response detection start module transmits the detection start signal to the reception response detection start module associated with the rolling bearing that is a subsequent vibration detection target.

* * * * *